(12) United States Patent  
Nakajima

(10) Patent No.: US 8,732,493 B2
(45) Date of Patent: May 20, 2014

(54) SEMICONDUCTOR INTEGRATED CIRCUIT

(75) Inventor: Hiroyuki Nakajima, Kanagawa (JP)

(73) Assignee: Renesas Electronics Corporation, Kawasaki, Kanagawa (JP)

(*) Notice: Subject to any disclaimer, the term of this patent is extended or adjusted under 35 U.S.C. 154(b) by 458 days.

(21) Appl. No.: 13/137,349

(22) Filed: Aug. 8, 2011

(65) Prior Publication Data

US 2012/0047376 A1 Feb. 23, 2012

(30) Foreign Application Priority Data

Aug. 19, 2010 (JP) ................................ 2010-184090

(51) Int. Cl.
G06F 1/00 (2006.01)

(52) U.S. Cl.
USPC ............ 713/310; 713/300; 713/320; 713/323

(58) Field of Classification Search
USPC ................................. 713/300, 310, 320, 323
See application file for complete search history.

(56) References Cited

U.S. PATENT DOCUMENTS 4,754,393 A * 6/1988 Kitson et al. .................. 712/234
5,289,116 A * 2/1994 Kurita et al. ............... 324/76.11
6,016,549 A * 1/2000 Matsushiba et al. .......... 713/324
2005/0273566 A1* 12/2005 Murayama ..................... 711/167
2008/0313377 A1* 12/2008 Kawano et al. ............... 710/244

FOREIGN PATENT DOCUMENTS

JP 6-253157 A 9/1994
JP 10-198421 A 7/1998

OTHER PUBLICATIONS

Reiner W. Hartenstein and Michal Z. Servit, Field-Programmable Logic Architectures, Synthesis and Application, Sep. 1994, p. 170-171.*

* cited by examiner

Primary Examiner — Kim Huynh
Assistant Examiner — Zahid Choudhury
(74) Attorney, Agent, or Firm — McGinn IP Law Group, PLLC

(57) ABSTRACT

In a semiconductor LSI that sequentially performs predetermined processing on data input successively, a host CPU, a plurality of sequencers, and a data engine are connected in a hierarchical manner with the host CPU at top and the data engine at bottom. Each sequencer includes a memory that stores a parameter for execution of the sequencer, a memory controller, a loop counter, a sequence controller, and an interface unit that handles transmission and reception of signals with an external unit of the sequencer. The interface units of the plurality of sequencers have the same specifications.

20 Claims, 14 Drawing Sheets

SEMICONDUCTOR INTEGRATED CIRCUIT

CROSS-REFERENCE TO RELATED APPLICATIONS

This application is based upon and claims the benefit of priority from Japanese patent application No. 2010-184090, filed on Aug. 19, 2010, the disclosure of which is incorporated herein in its entirety by reference.

BACKGROUND

The present invention relates to a semiconductor integrated circuit and, particularly, to a semiconductor integrated circuit including a plurality of sequencers.

Sequencers are often used in a semiconductor integrated circuit that is included in a video processing device, a communication device or the like to which data is successively input and that sequentially performs predetermined processing on the input data. Suggestions from various points of view have been made for such a semiconductor integrated For example, Japanese Unexamined Patent Application Publication No. H06-253157 discloses a technique that divides a control block into a total control block for control in units of lines and a control block for control in units of codewords and incorporates sequence control in units of codewords into a coding operation block in order to achieve speed enhancement and cost reduction of a binary picture signal coding LSI (semiconductor integrated circuit). This is described with reference to FIG. 14.

FIG. 14 corresponds to FIG. 1 of Japanese Unexamined Patent Application Publication No. H06-253157, through the reference symbols of the functional blocks are altered. Referring to FIG. 14, a coding LSI 31 includes a system bus I/F 33 that makes a connection to a control MPU 42, a total control sequencer 32 that is connected to the control MPU 42 through the system bus I/F 33, an image bus I/F 34, a line memory unit 35, and a coding operation unit 40. The coding operation unit 40 includes a change detection and mode determination processing unit 36, a code generation unit 37, a code packing unit 38, and a code output FIFO 39, which perform pipeline processing.

Image data is input to the line memory unit 35 from an image data input device 41 through the image bus I/F 34, output from the line memory unit 35 to the change detection and mode determination processing unit 36 of the coding operation unit 40, then processed by the change detection and mode determination processing unit 36, the code generation unit 37, the code packing unit 38 and the code output FIFO 39, and finally output to a code bus.

The respective functional blocks included, in the coding operation unit 40 include block sequencers that control processing performed by the corresponding functional blocks, and those block sequencers are controlled by the total control sequencer 32. Note that the total control sequencer 32 mainly performs control of start/stop of processing of each block sequencer, and each block sequencer performs control specialized to processing performed by the corresponding functional block.

Japanese Unexamined Patent Application Publication No. H10-198421 discloses a device for monitoring a failed state of a sequencer that is installed in a coal handling facility. The device is described with reference to FIG. 15.

FIG. 15 corresponds to FIG. 1 in Japanese Unexamined Patent Application Publication No. H10-198421. A failed state monitoring device 10 in FIG. 15 includes a CPU 11 that constitutes a monitoring control device, and two input devices 13 for the CPU 11. The two input devices 13 are composed of a signal transmission unit, and an on/off signal of a sequencer contact is output from a sequencer 12 of each of two coal handling lines A and B to a storage device 14 of the CPU 11.

According to Japanese Unexamined Patent Application Publication No. H10-198421, it is disclosed that the device can input the on/off signal for a contact of the sequencer 12 to the storage device 14 in correspondence to a cause of failure and store the signal in a hierarchical manner, display that there is a failure in a hierarchy level containing the cause of failure and a hierarchy level on its higher side on a display 15, and, based on the display, perform expansion from the higher level to the lower level by a mouse 17 repeatedly so as to examine the cause of failure, thereby finding the cause of failure easily without decoding a sequencer program.

In recent years, a demand for speeding up of a video processing device, a communication device and the like is ever increasing, and, accordingly, a system LSI that is used for such a device is experiencing an increase in the number of parallel processing and in circuit size. Further, for design of the system LSI, addition of a new functional block, an increase in the number of parallel processing of functional blocks, segmentation of a control method for a functional block and so on are required to enhance the performance in view of the applications, the customer needs, the market situation or the like, and various modifications are made to meet such requirements.

In such a background, a control architecture for achieving the easiness of the above-described modifications is required.

SUMMARY

The present inventor has found a problem that addition of a new function or modification of control are difficult in the coding LSI 31 shown in FIG. 14 because the total control sequencer 32 and each block sequencer of the coding operation unit 40 have different specifications.

Specifically, addition of a new function or modification of control are difficult in the coding LSI 31 shown in FIG. 14 because the total control sequencer 32 and each block sequencer of the coding operation unit 40 have different interface specifications, such as that types of signals to be input and output are different. For example, it is considered that each block sequencer of the coding operation unit 40 needs a different control signal to exert control specialized to processing performed by the functional block to which it belongs. In this case, if a circuit or the like is added to introduce a certain new function into the functional block, it is necessary to modify the operation of control of the block sequence, which raises a need for a significant change in the setting of the entire functional block.

An aspect of the present invention is a semiconductor integrated circuit that sequentially performs predetermined processing on data input successively. The semiconductor integrated circuit includes a host CPU, a data engine that executes the predetermined processing, and a plurality of sequencers. The host CPU, the data engine and the plurality of sequencers are connected in a hierarchical manner with the host CPU at top and the data engine at bottom.

Each of the sequencers includes a memory that stores a parameter for execution of the sequencer, a memory controller, a loop counter, a sequence controller, and an interface unit that handles transmission and reception of signals with an external unit of the sequencer.

Note that the "parameter" indicates various data to be used for execution of the sequencer, which may include a program code to be executed by the sequencer, a value necessary for sequence control and the like, for example. Note that the "value necessary for sequence control" may be an image size, the number of rows and the number of columns of a pixel and the like in the case of image processing, for example.

The data engine includes a memory that stores a parameter for execution of the data engine, and an interface unit that handles transmission and reception of signals with an external unit of the data engine. The "parameter" also indicates various data to be used for execution of the data engine.

The host CPU includes an interface unit that handles transmission and reception of signals with an external unit of the host CPU.

The interface units of the plurality of sequencers have the same specifications, and each interface unit includes a first master interface unit, a second master interface unit, a first slave interface unit, and a second slave interface unit.

The interface units of the sequencers "have the same specifications" indicates that those interface units have the same configuration, and the bit width of a signal flowing therethrough and the significance of each bit are the same.

The first master interface unit of each sequencer is an interface for accessing a memory in an external functional block of the sequencer.

The second master interface unit of each sequencer is an interface for controlling execution of an external functional block of the sequencer. Note that "controlling execution" is to control start, stop and the like of execution, for example.

The first slave interface unit of each sequencer is an interface for allowing access to the memory of the sequencer by an external functional block of the sequencer.

The second slave interface unit of each sequencer is an interface for allowing control of execution of the sequencer by an external functional block of the sequencer.

The interface unit of the host CPU includes a first master interface unit and a second master interface unit respectively having the same specifications as the first master interface unit and the second master interface unit of the sequencers. The first master interface unit of the host CPU is an interface for accessing a memory in an external functional block of the host CPU. The second master interface unit of the host CPU is an interface for controlling execution of an external functional block of the host CPU.

The interface unit of the data engine includes a first slave interface unit and a second slave interface unit respectively having the same specifications as the first slave interface unit and the second slave interface unit of the sequencers. The first slave interface unit of the data engine is an interface for allowing access to the memory of the data engine by an external functional block of the data engine. The second slave interface unit of the data engine is an interface for allowing control of execution of the data engine by an external functional block of the data engine.

The host CPU, the data engine and the plurality of sequencers are connected in such a way that a higher level accesses a memory of one or a plurality of lower levels through the first master interface unit of the higher level and the first slave interface unit of the one or the plurality of lower levels, and a higher level controls execution of an immediately lower level through the second master interface unit of the higher level and the second slave interface unit of the immediately lower level.

Note that the "higher level" includes not only an immediately higher level of a given functional block (i.e., the host CPU or the sequencer) but also any of the host CPU and the sequencer placed at higher levels than the functional block.

Further, the "lower level" includes not only an immediately lower level of a given functional block (i.e., the sequencer or the data engine) but also any of the sequencer and the data engine placed at lower levels than the functional block.

The implementation of the semiconductor integrated circuit according to the above-described aspect as a method or a system, a video processing device or a communication device that incorporates the semiconductor integrated circuit and so on are also effective as aspects of the present invention.

According to the technique of the present invention, modification such as addition of performance can be easily done for a device that performs control using sequencers, thereby enabling flexible LSI design.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Embodiments of the present invention will be explained hereinbelow with reference to the drawings. The following description and the attached drawings are appropriately shortened and simplified to clarify the explanation, excluding those related to the present invention.

<First Embodiment>

Figure 1:
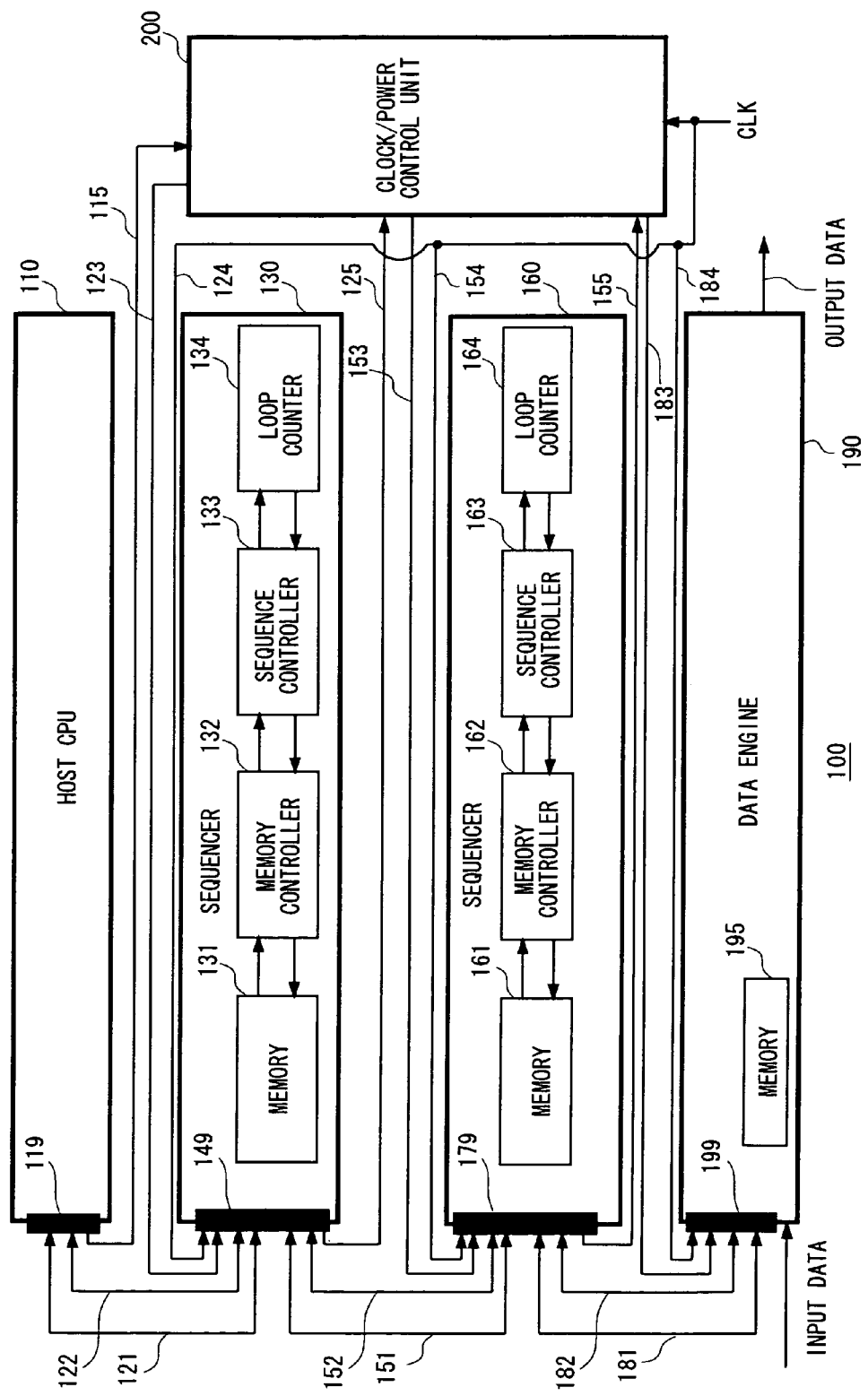
FIG. 1 is a view showing a semiconductor LSI according to a first embodiment of the present invention.

FIG. 1 shows a semiconductor integrated circuit (which is referred to hereinafter as a semiconductor LSI) 100 according to a first embodiment of the present invention. The semiconductor LSI 100 is mounted on a video processing device, for example, and sequentially performs predetermined processing on frame data that is successively input ("input data" in FIG. 1) and outputs the processed data. The semiconductor LSI 100 includes a host CPU 110, a sequencer 130, a sequencer 160, a data engine 190, and a clock/power control unit 200. The above-described predetermined processing is image quality improvement processing corresponding to the picture mode of input video, for example. Further, the image quality improvement processing is noise reduction, for example.

The host CPU 110, the sequencer 130, the sequencer 160 and the data engine 190 are connected in a hierarchical manner, with the host CPU 110 at the top and the data engine 190 at the bottom. In the example of FIG. 1, the number of sequencers is two, and the sequencer 130 is a higher-level sequencer, and the sequencer 160 is a lower-level sequencer.

The data engine 190 performs the above-described predetermined processing.

The clock/power control unit 200 receives a clock CLK and controls. clock supply to the sequencer 130, the sequencer 160 and the data engine 190, and further controls power supply to those functional blocks. The control is made according to clock/power control signals, which are described later, from the host CPU 110, the sequencer 130 and the sequencer 160.

In the following description, the state of the functional block where clock supply is blocked while power supply is provided is referred to as "sleep". Further, the state of the functional block where power supply is blocked is referred to as "power-off". Further, the state of the functional block where both clock and power supply is provided is referred to as "active".

The host CPU 110 includes an interface unit 119 that handles transmission and reception of signals with an external unit.

The sequencer 130 includes a memory 131 that stores parameters for execution of itself, a memory controller 132, a sequence controller 133, a loop counter 134, and an interface unit 149 that handles transmission and reception of signals with an external unit.

The sequencer 160 includes a memory 161 that stores parameters for execution of itself, a memory controller 162, a sequence controller 163, a loop counter 164, and an interface unit 179 that handles transmission and reception of signals with an external unit.

The data engine 190 includes a memory 195 that stores parameters for execution of itself, and an interface unit 199 that handles transmission and reception of signals with an external unit.

The interface units of the sequencer 130 and the sequencer 160 have the same specifications. Specifically, the interface unit 149 and the interface unit 179 have the same configuration, and the bit width of a signal flowing therethrough and the significance of each bit are the same.

A memory bus 121 and a control bus 122 are connected between the interface unit 119 of the host CPU 110 and the interface unit 149 of the sequencer 130.

Further, the interface unit 119 of the host CPU 110 is connected with the clock/power control unit 200 by a clock/power control bus 115, and transmits a clock/power control signal for controlling clock and power supply to the sequencer 130 at the immediately lower level to the clock/power control unit 200 through the clock/power control bus 115.

Further, the interface unit 149 of the sequencer 130 is connected with the clock/power control unit 200 by a clock/power control line 123 and a clock/power control bus 125, and receives clock and power supply from the clock/power control unit 200 through the clock/power control line 123 and supplies the clock and power to the sequencer 130, and transmits a clock/power control signal for controlling clock and power supply to the sequencer 130 and the sequencer 160 at the immediately lower level to the clock/power control unit 200 through the clock/power control bus 125.

The interface unit 149 of the sequencer 130 is further connected with a line 124 which is different from the clock/power control line 123, and receives clock supply when the sequencer 130 is in sleep mode through the line 124 and supplies the clock to the sequencer 130.

To facilitate understanding, the "clock/power control line 123" is referred to as "first line 123", and the "line 124" is referred to as "second line 124".

A memory bus 151 and a control bus 152 are connected between the interface unit 149 of the sequencer 130 and the interface unit 179 of the sequencer 160.

Further, the interface unit 179 of the sequencer 160 is connected with the clock/power control unit 200 by a clock/power control line 153 and a clock/power control bus 155, and receives clock and power supply from the clock/power control unit 200 through the clock/power control line 153 and supplies the clock and power to the sequencer 160, and transmits a clock/power control signal for controlling clock and power supply to the sequencer 160 and the data engine 190 at the immediately lower level to the clock/power control unit 200 through the clock/power control bus 155.

The interface unit 179 of the sequencer 160 is further connected with a line 154 which is different from the clock/power control line 153, and receives clock supply when the sequencer 160 is in sleep mode through the line 154 and supplies the clock to the sequencer 160.

To facilitate understanding, the "clock/power control line 153" is referred to as "first line 153", and the "line 154" is referred to as "second line 154".

A memory bus 181 and a control bus 182 are connected between the interface unit 179 of the sequencer 160 and the interface unit 199 of the data engine 190.

The interface unit 199 of the data engine 190 is connected with the clock/power control unit 200 by a clock/power control line 183, and receives clock and power supply from the clock/power control unit 200 through the clock/power control line 183 and supplies the clock and power to the data engine 190.

The interface unit 199 of the data engine 190 is further connected with a line 184 which is different from the clock/power control line 183, and receives clock supply when the data engine 190 is in sleep mode through the line 184 and supplies the clock to the data engine 190.

To facilitate understanding, the "clock/power control line 183" is referred to as "first line 183", and the "line 184" is referred to as "second line 184".

Figure 2:
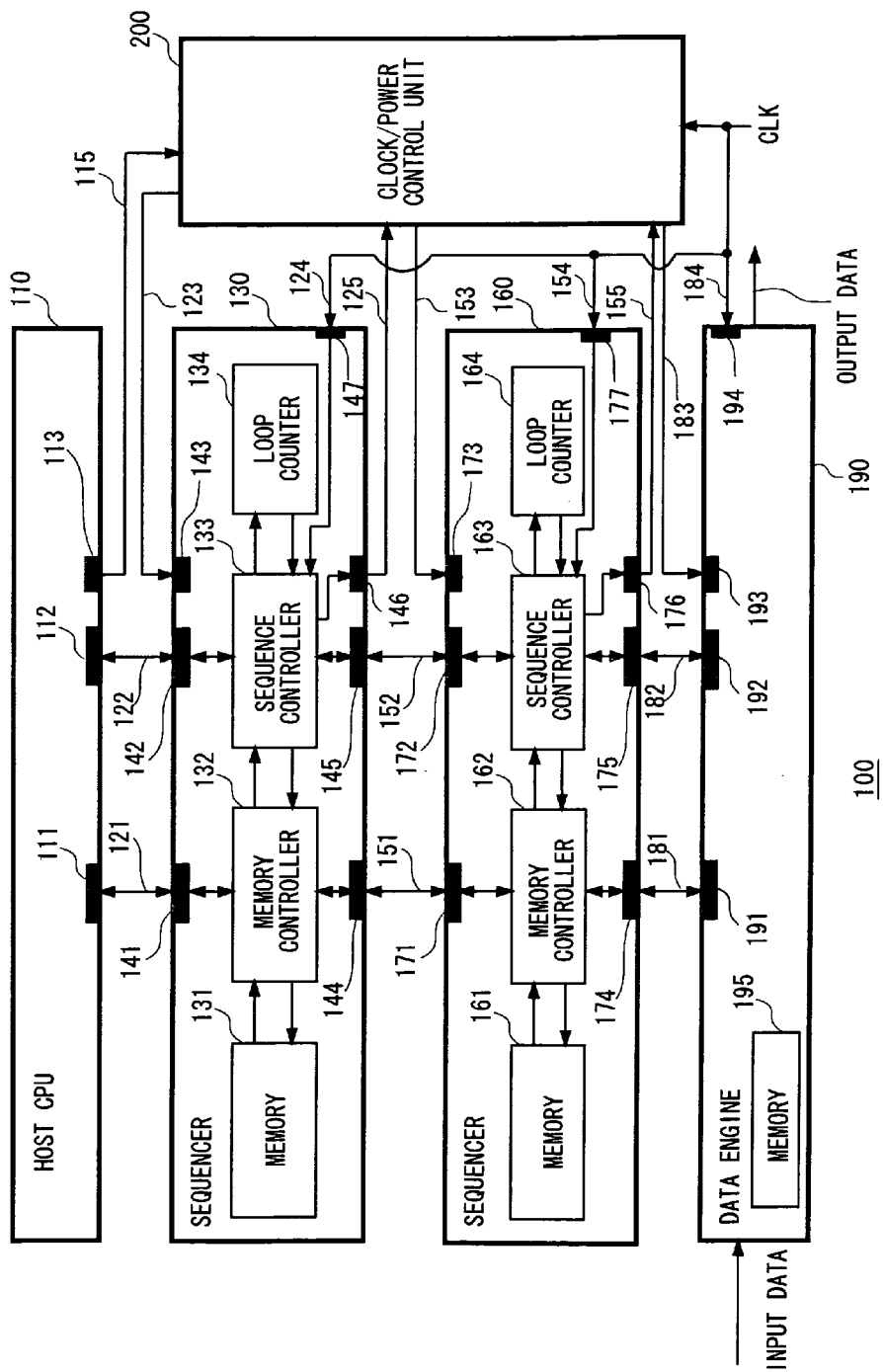
FIG. 2 is a view showing the semiconductor LSI of FIG. 1, with a more detailed illustration of interface units.

FIG. 2 is a view showing the semiconductor LSI of FIG. 1, with a more detailed illustration of the interface units of the functional blocks. The semiconductor LSI 100 is described in further detail with reference to FIG. 2.

The interface unit 119 of the host CPU 110 includes a first master interface unit 111, a second master interface unit 112, and a clock/power control interface unit 113.

The interface unit 149 of the sequencer 130 includes a first slave interface unit 141, a second slave interface unit 142, a first input interface unit 143, a first master interface unit 144, a second master interface unit 145, a clock/power control interface unit 146, and a second input interface unit 147.

The interface unit 179 of the sequencer 160 includes a first slave interface unit 171, a second slave interface unit 172, a first input interface unit 173, a first master interface unit 174, a second master interface unit 175, a clock/power control interface unit 176, and a second input interface unit 177.

The interface unit 199 of the data engine 190 includes a first slave interface unit 191, a second slave interface unit 192, a first input interface unit 193, and a second input interface unit 194.

The first master interface unit of each functional block is an interface that allows the functional block, as a master side, to access a memory in an external functional block. Further, the first master interface units of the respective functional blocks, which are the first master interface unit 111 of the host CPU 110, the first master interface unit 144 of the sequencer 130, and the first master interface unit 174 of the sequencer 160, have the same specifications.

The second master interface unit of each functional block is an interface that allows the functional block, as a master side, to control execution of an external functional block. Further, the second master interface units of the respective functional blocks, which are the second master interface unit 112 of the host CPU 110, the second master interface unit 145 of the sequencer 130, and the second master interface unit 175 of the sequencer 160, have the same specifications.

The first slave interface unit of each functional block is an interface that allows the functional block, as a slave side, to be accessed at its memory by an external functional block. Further, the first slave interface units of the respective functional blocks, which are the first slave interface unit 141 of the sequencer 130, the first slave interface unit 171 of the sequencer 160, and the first slave interface unit 191 of the data engine 190, have the same specifications which correspond to the first master interface units.

The second slave interface unit of each functional block is an interface that allows the functional block, as a slave side, to be controlled for its execution by an external functional block. Further, the second slave interface units of the respective functional blocks, which are the second slave interface unit 142 of the sequencer 130, the second slave interface unit 172 of the sequencer 160, and the second slave interface unit 192 of the data engine 190, have the same specifications which correspond to the second master interface units.

In this embodiment, the host CPU 110, the sequencer 130, the sequencer 160 and the data engine 190 are connected in such a way that a higher level (the host CPU 110 or the sequencer) accesses a memory of an immediately lower level (the sequencer or the sequencer) through the first master interface unit of its own and the first slave interface unit of the immediately lower level, and a higher level controls execution of an immediately lower level through the second master interface unit of its own and the second slave interface unit of the immediately lower level.

As shown in FIG. 2, the first master interface unit 111 of the host CPU 110 and the first slave interface unit 141 of the sequencer 130 at the immediately lower level of the host CPU 110 are connected by the memory bus 121, and the first slave interface unit 141 is further connected with the memory controller 132. Therefore, the host CPU 110 can access the memory 131 of the sequencer 130 through the first master interface unit 111, the memory bus 121, the first slave interface unit 141, and the memory controller 132.

Likewise, the sequencer 130 can access the memory 161 of the sequencer 160 through the first master interface unit 144, the memory bus 151, the first slave interface unit 171, and the memory controller 162.

Further, the sequencer 160 can also access the memory 195 of the data engine 190 through the first master interface unit 174, the memory bus 181, the first slave interface unit 191, and a functional block (not shown) that has the same function as the memory controller in the data engine 190.

Further, the second master interface unit 112 of the host CPU 110 and the second slave interface unit 142 of the sequencer 130 are connected by the control bus 122, and the second slave interface unit 142 is further connected with the sequence controller 133. Therefore, the host CPU 110 can control execution of the sequencer 130 by controlling the sequence controller 133 through the second master interface unit 112, the control bus 122, and the second slave interface unit 142.

Likewise, the sequencer 130 can control execution of the sequencer 160 through the second master interface unit 145, the control bus 152, and the second slave interface unit 172.

Further, the sequencer 160 can also control execution of the data engine 190 through the second master interface unit 175, the control bus 182, and the second slave interface unit 192.

In this embodiment, the host CPU 110, the sequencer 130 and the sequencer 160 access the memory at the immediately lower level when setting a parameter to the immediately lower level and when referring to the memory at the immediately lower level for controlling execution of the immediately lower level.

The sequencer 130, the sequencer 160 and the data engine 190 execute processing by referring to the parameter which is set to the memory of their own. With the progress of this processing, the state of the parameter stored in the memory varies.

The host CPU 110, the sequencer 130 and the sequencer 160 access the memory at the immediately lower level and set a parameter to the immediately lower level. After that, they access the memory at the immediately lower level and refer to the state of the parameter, and control the subsequent execution of the immediately lower level according to the state of the parameter.

The clock/power control interface unit 113 of the host CPU 110 is an interface for the host CPU 110 to transmit a clock/power control signal for controlling clock and power supply to the immediately lower level (i.e., the sequencer 130 in this example) to the clock/power control unit 200, and it is connected with the clock/power control unit 200 through the clock/power control bus 115.

The first input interface unit 143 of the sequencer 130 is a clock/power input interface that receives clock and power supply from the clock/power control unit 200 and supplies the clock and power to the sequencer 130, and it is connected with the clock/power control unit 200 through the first line 123.

The clock/power control interface unit 146 of the sequencer 130 is an interface for the sequencer 130 to transmit a clock/power control signal for controlling clock and power supply to the sequencer 130 itself or the immediately lower level (i.e., the sequencer 160) to the clock/power control unit 200, and it is connected with the clock/power control unit 200 through the clock/power control bus 125.

The second input interface unit 147 of the sequencer 130 is an interface that receives clock supply when the sequencer 130 is in sleep mode from the second line 124 and supplies the clock to the sequencer 130.

The first input interface unit 173, the clock/power control interface unit 176 and the second input interface unit 177 of the sequencer 160 have functions respectively corresponding to the first input interface unit 143, the clock/power control interface unit 146 and the second input interface unit 147 of the sequencer 130, and detailed explanation thereof is omitted.

The first input interface unit 193 of the data engine 190 is a clock/power input interface that receives clock and power supply from the clock/power control unit 200 and supplies the clock and power to the data engine 190, and it is connected with the clock/power control unit 200 through the first line 183.

The second input interface unit 194 of the data engine 190 is an interface that receives clock supply when the data engine 190 is in sleep mode from the second line 184 and supplies the clock to the data engine 190.

Hereinafter, control of clock supply and power supply to the sequencer 130, the sequencer 160 and the data engine 190 is described using the clock/power control signal which is output from the host CPU 110 to the clock/power control unit 200 and the clock/power control signal which is output from the sequencer 130 and the sequencer 160 to the clock/power control unit 200 as examples.

Figure 3:
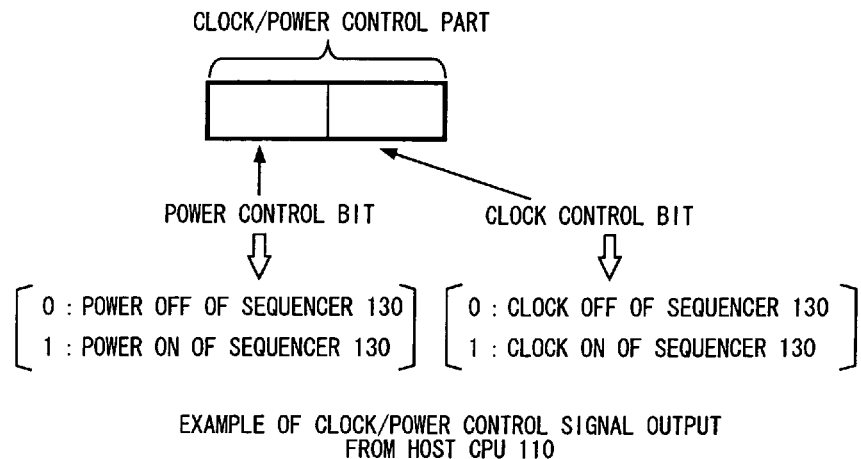
FIG. 3 is a view showing an example of a clock/power control signal output from a host CPU in the semiconductor LSI shown in FIGS. 1 and 2.

FIG. 3 shows an example of the clock/power control signal which is output from the host CPU 110 to the clock/power control unit 200, that is, the signal which flows through the clock/power control bus 115.

As shown in the example of FIG. 3, the clock/power control signal which is output from the host CPU 110 is made up of a two-bit clock/power control part. One bit (e.g., a low-order bit) is a clock control bit for controlling clock supply to the immediately lower level of the host CPU 110 (i.e., the sequencer 130), and the other one bit is a power control bit for controlling power supply to the sequencer 130.

In the example of FIG. 3, the clock control bit of "0" indicates blocking clock supply to the sequencer 130. Note that, in the state where clock supply to the sequencer 130 is already blocked, it indicates continuously blocking clock supply to the sequencer 130. Further, the clock control bit of "1" indicates enabling clock supply to the sequencer 130. Note that, in the state where clock supply to the sequencer 130 is already enabled, it indicates continuing clock supply to the sequencer 130.

Likewise, the power control bit of "0" indicates blocking power supply to the sequencer 130. Note that, in the state where power supply to the sequencer 130 is already blocked, it indicates continuously blocking power supply to the sequencer 130. Further, the power control bit of "1" indicates enabling power supply to the sequencer 130. Note that, in the state where power supply to the sequencer 130 is already enabled, it indicates continuing power supply to the sequencer 130.

For example, when the clock/power control signal "10" is output from the host CPU 110 to the clock/power control unit 200 in the state where both clock and power are supplied from the clock/power control unit 200 to the sequencer 130, clock supply to the sequencer 130 is blocked while power supply to the sequencer 130 is maintained.

Figure 4:
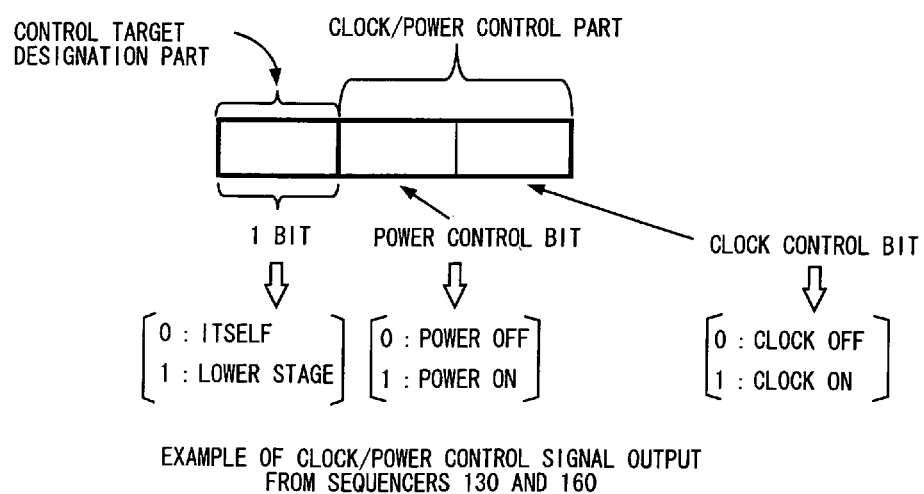
FIG. 4 is a view showing an example of a clock/power control signal output from each sequencer in the semiconductor LSI shown in FIGS. 1 and 2.

FIG. 4 shows an example of the clock/power control signal which is output from the sequencer 130 and the sequencer 160 to the clock/power control unit 200, that is, the signal which flows through the clock/power control bus 125 and the clock/power control bus 155.

As shown in the example of FIG. 4, the clock/power control signal which is output from the sequencer 130 and the sequencer 160 is made up of a one-bit control target designation part and a two-bit clock/power control part.

The one-bit control target designation part indicates for which of the sequencer that outputs the control signal and the immediately lower level of the sequencer the control signal controls clock/power supply. For example, the one-bit control target designation part of "0" indicates that the control signal controls clock/power supply of the sequencer itself. Further, the one-bit control target designation part of "1" indicates that the control signal controls clock/power supply of the immediately lower level of the sequencer.

Specifically, in the case of the clock/power control signal which is output from the sequencer 130, the one-bit control target designation part indicates either the sequencer 130 or the sequencer 160 (the immediately lower level); in the case of the clock/power control signal which is output from the sequencer 160, the one-bit control target designation part indicates either the sequencer 160 or the data engine 190 (the immediately lower level).

Note that the clock/power control part that is contained in the clock/power control signal which is output from the sequencer 130 and the sequencer 160 is the same as the clock/power control signal (only the clock/power control part) which is output from the host CPU 110 except that its control target is the functional block which is indicated by the control target designation part that is contained in the clock/power control signal, and detailed explanation thereof is omitted.

For example, when the clock/power control signal "110" is output from the sequencer 130 to the clock/power control unit 200 in the state where both clock and power are supplied to the sequencer 130 and the sequencer 160, clock supply to the immediately lower level of the sequencer 130 (i.e., the sequencer 160) is blocked while power supply to the sequencer 160 is maintained. Further, when the clock/power control signal "010" is output from the sequencer 130 to the clock/power control unit 200 in the same state, clock supply to the sequencer 130 is blocked while power supply to the sequencer 130 is maintained.

Likewise, when the clock/power control signal "110" is output from the sequencer 160 to the clock/power control unit 200 in the state where both clock and power are supplied to the sequencer 160 and the data engine 190, clock supply to the immediately lower level of the sequencer 160 (i.e., the data engine 190) is blocked while power supply to the data engine 190 is maintained. Further, when the clock/power control signal "010" is output from the sequencer 160 to the clock/power control unit 200 in the same state, clock supply to the sequencer 160 is blocked while power supply to the sequencer 160 is maintained.

Note that the clock/power control signal which is output from the sequencer 130 and the sequencer 160 is not limited to the structure shown in FIG. 4, as long as it can indicate which functional block is subject to control and whether clock supply and power supply to the functional block is to be "enabled" or "blocked".

The sequencer 130 includes a functional block (not shown) that operates even in sleep mode. The functional block is incorporated in the sequence controller 133, and a clock is supplied thereto from the second line 124 through the second input interface unit 147. Hereinafter, the functional block is referred to as a sleep control block. Note that, in the sequencer 130, the loop counter 134 holds the count value in sleep mode.

Likewise, the sequencer 160 and the data engine 190 include a sleep control block, which is not shown. Further, in the sequencer 160 also, the loop counter 164 holds the count value in sleep mode.

When the sequencer 130 is in sleep mode, it can cancel the sleep mode by the clock/power control signal which is output from the host CPU 110 or the clock/power control signal which is output from the sequencer 130 itself. "Canceling the sleep mode" indicates starting clock supply.

Cancel of the sleep mode of the sequencer 130 can be made by the immediately higher level (the host CPU 110) and the sequencer 130 itself. The sequencer 130 cancels the sleep mode of its own by the sleep control block that is included in the sequencer 130. For example, it is assumed that the sequencer 130 enters the sleep mode after starting execution of the sequencer 160. The execution of the sequencer 160 progresses, and, at predetermined timing to cancel the sleep mode of the sequencer 130, a trigger signal is input to the sequencer 130. The trigger signal is output from the sequence controller 163 of the sequencer 160 to the sequence controller 133 of the sequencer 130 through the control bus 152, for example. Receiving the trigger signal from the sequencer 160, the sleep control block, not shown, in the sequence controller 133 of the sequencer 130 outputs the clock/power control signal indicating clock supply to the sequencer 130 to the clock/power control unit 200. The clock supply from the clock/power control unit 200 to the sequencer 130 is thereby resumed, and the sleep mode of the sequencer 130 is cancelled.

Note that cancel of the power-off mode of the sequencer 130 cannot made by the sequencer 130 itself, and it is made by the immediately higher level (the host CPU 110).

Likewise, cancel of the sleep mode of the sequencer 160 can be made by the immediately higher level (the sequencer 130) and the sequencer 160 itself. The sequencer 160 cancels the sleep mode of its own by the sleep control block included in the sequencer 160. In this case, in response to a trigger signal from a lower level (the data engine 190), for example, the sleep control block of the sequencer 160 outputs the clock/power control signal indicating clock supply to the sequencer 160 to the clock/power control unit 200. The clock supply from the clock/power control unit 200 to the sequencer 160 is thereby resumed, and the sleep mode of the sequencer 160 is cancelled.

Note that cancel of the power-off mode of the sequencer 160 cannot be made by the sequencer 160 itself, and it is made by the immediately higher level (the sequencer 130).

In the semiconductor LSI 100 according to this embodiment, each sequencer includes the memory that stores parameters containing a program for execution of itself and the memory controller, and the interface unit of each sequencer has the same specifications. Therefore, addition of a new function, modification of a function and the like can be made easily.

For example, because each sequencer includes the memory and the memory controller,'a program code for execution of the sequencer can be rewritten by a higher level. Specifically, a programmable sequencer can be implemented. Further, because the interface unit of each sequencer has the same specifications, modification of a function can be done without changing a method for sequence control of the entire semiconductor LSI, as long as the specifications of signals transmitted and received by each sequencer can be made to comply with the specifications of the interface unit when rewriting the program code.

Further, when it is necessary to add another sequencer to the same layer as the sequencer 160 (the layer controlled by the sequencer 130) in order to add a new function, for example, if the same sequencer as the sequencer 130 and the sequencer 160 is connected to the sequencer 130, the sequencer 130 can perform the same control for the added sequencer in addition to the sequencer 160.

Further, because each sequencer is programmable and the interface unit of each sequencer has the same specifications, design is easy when it is necessary to increase the number of hierarchy levels of sequencers in order to modify the function of the semiconductor LSI. Thus, the hierarchy of sequencers can be easily segmented by the technique according to the present invention. The same applies to the case where it is necessary to reduce the number of hierarchy levels of sequencers.

In the semiconductor LSI 100 according to this embodiment, the host CPU 110 and each sequencer, in order to control execution of an immediately lower level (either sequencer or the data engine 190), access the memory at the immediately lower level and refer to the state of the parameter stored in the memory through the first master interface unit of itself and the first slave interface unit of the immediately lower level. Further, the host CPU 110 and each sequencer control execution of the immediately lower level through the second master interface unit of itself and the second slave interface unit of the immediately lower level. Specifically, between the functional block (the host CPU 110 or the sequencer) on the master side which controls execution and the functional block (the sequencer or the data engine 190) on the slave side whose execution is controlled, a channel for referring to the memory on the salve side (which is referred to as a reference channel) and a channel for controlling execution on the salve side (which is referred to as a control channel) are independent of each other.

If the reference channel and the control channel are the same, because reference to the memory on the salve side and control of execution on the salve side are performed in an exclusive manner, a wait state of one cycle or more occurs at the time of making reference or controlling execution.

On the other hand, in the semiconductor LSI 100 according to this embodiment, because the reference channel and the control channel are independent of each other, the above-described wait state is avoided, thereby enhancing the speed.

Further, in the semiconductor LSI 100 according to this embodiment, each sequencer has a configuration that can control clock and power supply to itself and the immediately lower level. The sequencer 130 and the sequencer 160 are taken as examples. Further, in each sequencer and the data engine 190, a period from the previous count-up to the current count-up of the loop counter is referred to as one loop. The loops in the sequencer 130 and the sequencer 160 are respectively referred to as "higher loop" and "lower loop".

Because the sequencer 130 does not need to operate between two higher loops, it can block clock supply to itself and enter the sleep mode when one higher loop is started. Then, when each lower loop which is under the higher loop is completed, the sequencer 160 transmits a trigger signal to the sequencer 130 to cancel the sleep mode of the sequencer 130, so that the next higher loop can be started. In this manner, clock or power supply to each functional block of the semiconductor LSI 100 can be controlled diligently, and power consumption of the semiconductor LSI 100 can be thereby suppressed efficiently. Note that, for more precise control of power consumption, the number of levels of sequencers between the host CPU and the data engine may be increased. This is further described later using a fourth embodiment.

<Second Embodiment>

Figure 5:
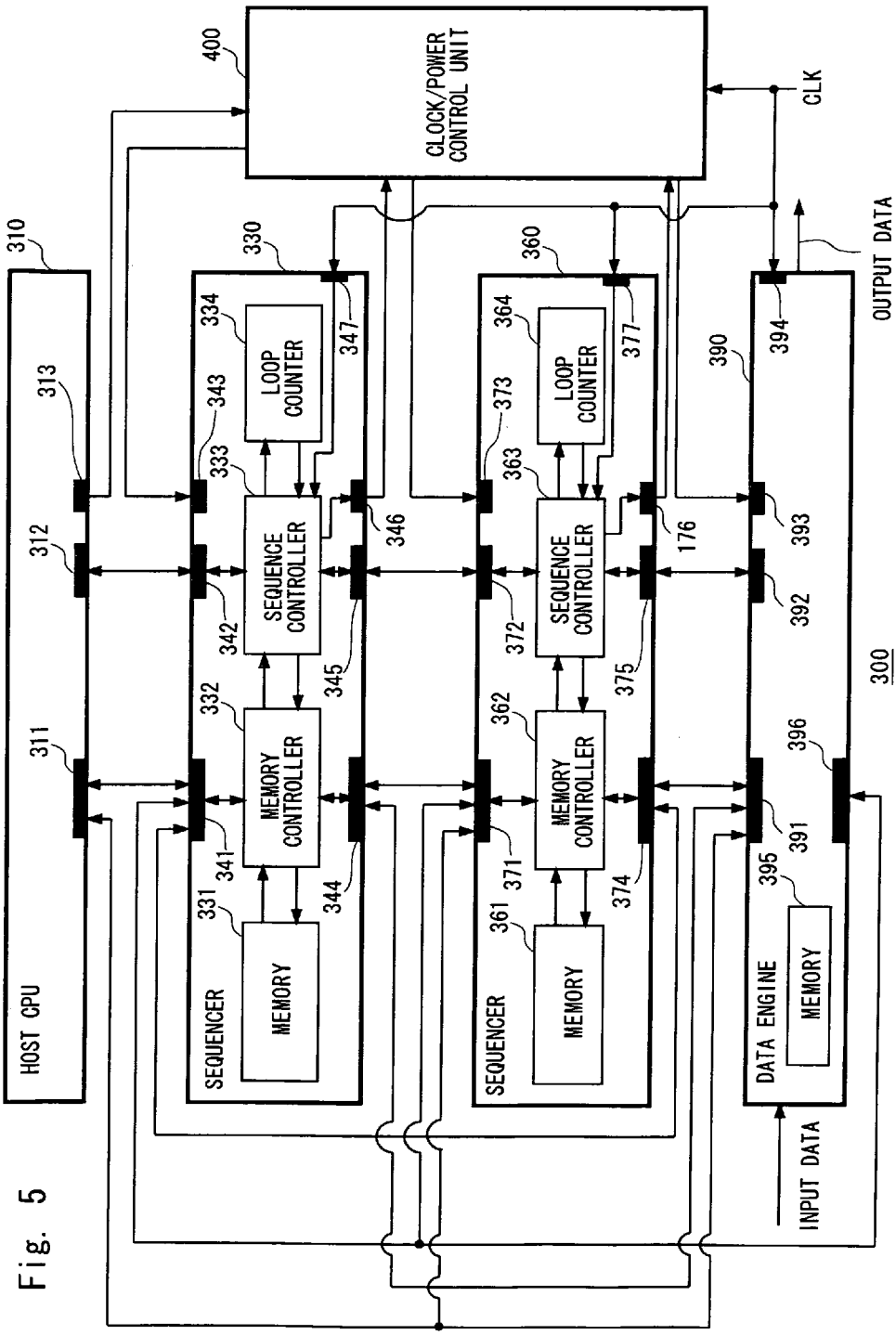
FIG. 5 is a view showing a semiconductor LSI according to a second embodiment of the present invention.

FIG. 5 shows a semiconductor LSI 300 according to a second embodiment of the present invention. The semiconductor LSI 300 is also mounted on a video processing device, for example, and sequentially performs predetermined processing on frame data that is successively input ("input data") and outputs the processed data. The semiconductor LSI 300 includes a host CPU 310, a sequencer 330, a sequencer 360, a data engine 390, and a clock/power control unit 400. The above-described predetermined processing is image quality improvement processing corresponding to the picture mode of input video, for example. Further, the image quality improvement processing is noise reduction, for example.

The host CPU 310, the sequencer 330, the sequencer 360 and the data engine 390 are connected in a hierarchical manner, with the host CPU 310 at the top and the data engine 390 at the bottom.

The data engine 390 performs the above-described predetermined processing.

The clock/power control unit 400 receives a clock CLK and controls clock supply to the sequencer 330, the sequencer 360 and the data engine 390, and further controls power supply to those functional blocks. Note that the control is made according to clock/power control signals from the host CPU 310, the sequencer 330 and the sequencer 360.

The host CPU 310 includes a first master interface unit 311, a second master interface unit 312, and a clock/power control interface unit 313.

The sequencer 330 includes a memory 331, a memory controller 332, a sequence controller 333, a loop counter 334, a first slave interface unit 341, a second slave interface unit 342, a first input interface unit 343, a first master interface unit 344, a second master interface unit 345, a clock/power control interface unit 346, and a second input interface unit 347.

The sequencer 360 includes a memory 361, a memory controller 362, a sequence controller 363, a loop counter 364, a first slave interface unit 371, a second slave interface unit 372, a first input interface unit 373, a first master interface unit 374, a second master interface unit 375, a clock/power control interface unit 376, and a second input interface unit 377.

The data engine 390 includes a memory 395, a first slave interface unit 391, a second slave interface unit 392, a first input interface unit 393, a second input interface unit 394, and a first master interface unit 396.

For simplification of drawings, in FIG. 5, reference numerals are omitted for memory buses, control buses, lines for clock and power supply and the like.

The semiconductor LSI 300 according to this embodiment is the same as the semiconductor LSI 100 shown in FIG. 2 in the configurations of the functional blocks, the connections between the functional blocks and so on, except the points described hereinbelow. Therefore, different points of the semiconductor LSI 300 from the semiconductor LSI 100 are mainly described below.

In the semiconductor LSI 100, the host CPU 110 and each sequencer access the memory at the immediately lower level only. On the other hand, in the semiconductor LSI 300 according to this embodiment, the host CPU 310 and the sequencer 330 are connected to be able to access the memory at all lower levels including the immediately lower level.

Specifically, the first master interface unit 311 of the host CPU 310 is connected with the first slave interface unit 341 of the sequencer 330 and further connected with the first slave interface unit 371 of the sequencer 360 and the first slave interface unit 391 of the data engine 390. Therefore, the host CPU 310 can access any of the memory 331, the memory 361 and the memory 395 and set a parameter to any of the sequencer 330, the sequencer 360 and the data engine 390.

Likewise, the sequencer 330 can set a parameter to any of the sequencer 360 and the data engine 390.

Specifically, in the semiconductor LSI 300 according to this embodiment, because each sequencer includes the memory and the memory controller, a higher level (the host CPU or the sequencer) can set a parameter not only for the immediately lower level but also for a lower level skipping some hierarchy levels (the sequencer or the data engine). This enhances the freedom of design of the semiconductor LSI.

Further, in the semiconductor LSI 300 according to this embodiment, the sequencer 360 is connected to be able to access the memory 331 of the sequencer 330 at the higher level.

Specifically, the first master interface unit 374 of the sequencer 360 and the first slave interface unit 341 of the sequencer 330 are connected through a memory bus, and the sequencer 360 can thereby access the memory 331 of the sequencer 330.

Further, in the semiconductor LSI 300 according to this embodiment, the data engine 390 includes the first master interface unit 396. The first master interface unit 396 has the same specifications as the first master interface unit of each sequencer. Further, the data engine 390 is connected to be able to access the memories of the sequencer 330 and the sequencer 360.

Specifically, the first master interface unit 396 of the data engine 390 and the first slave interface unit 341 of the sequencer 330 are connected through a memory bus, and the data engine 390 can thereby access the memory 331 of the sequencer 330. Likewise, the first master interface unit 396 of the data engine 390 and the first slave interface unit 371 of the sequencer 360 are connected through a memory bus, and the data engine 390 can thereby access the memory 361 of the sequencer 360.

In sum, in the semiconductor LSI 300 according to this embodiment, each sequencer and the data engine are connected to be able to access the memory at the higher level. The capacity of the memory can be thereby reduced. For example, it is assumed that, in a semiconductor LSI which performs video processing and in which a sequencer 1, a sequencer 2 and a sequencer 3 are connected in a hierarchical fashion between a host CPU and a data engine, parameters set to the sequencer 1 by the host CPU include "picture mode" or "image size" of a frame, the sequencer 2 uses the picture mode, and the sequencer 3 uses the image size in some cases. In such a case, because the sequencer 2 can read "picture mode" from the memory of the sequencer 1, there is no need to set "picture mode" for the sequencer 2. Likewise, because the sequencer 3 can read "image size" from the memory of the sequencer 1, there is no need to set "image size" for the sequencer 3. The capacity of the memories of the sequencer 2 and the sequencer 3 can be thereby reduced.

Figure 6:
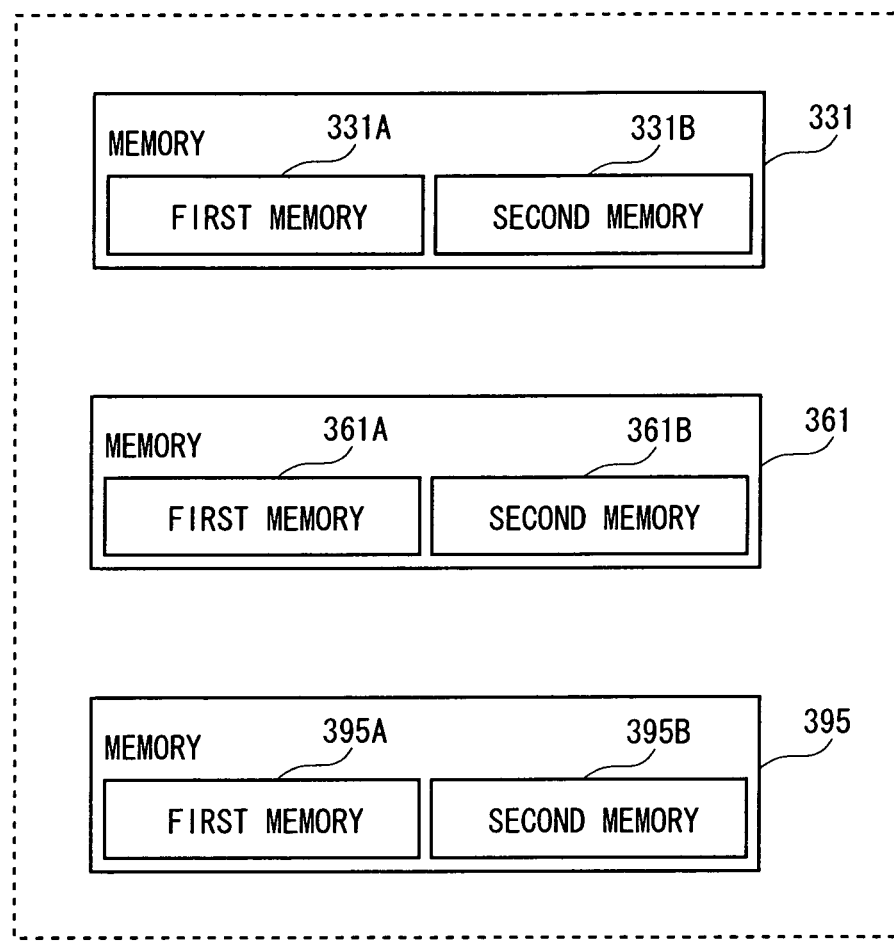
FIG. 6 is a view showing memories of sequencers and a data engine of the semiconductor LSI shown in FIG. 5.

FIG. 6 shows the configuration of the memory in each sequencer and the data engine 390 in the semiconductor LSI 300. As shown therein, the memory 331 of the sequencer 330 includes a first memory 331A and a second memory 331B, which are registers, for example, the memory 361 of the sequencer 360 includes a first memory 361A and a second memory 361B, and the memory 395 of the data engine 390 includes a first memory 395A and a second memory 395B.

In the semiconductor LSI 300 according to this embodiment, each sequencer and the data engine 390 copy the parameter which is set to the first memory of itself to the second memory and then execute processing by referring to the parameter which has been copied to the second memory. When setting a parameter to the lower level, the host CPU 310 and each sequencer set the parameter to the first memory of the lower level, and, when controlling execution of the immediately lower level, refer to the state of the parameter in the second memory of the immediately lower level.

For example, at the start of the current loop, the data engine 390 copies the parameter which is set to the first memory 395A in the memory 395 to the second memory 395B and then executes processing by referring to the second memory 395B. At the completion of processing of the current loop, the data engine 390 copies the parameter which is set to the first memory 395A to the second memory 395B again and then executes processing by referring to the second memory 395B.

When the host CPU 310, the sequencer 330 and the sequencer 360 set a parameter to the data engine 390, they set the parameter to the first memory 395A.

The sequencer 360 refers to the second memory 395B of the data engine 390 and grasps the state of the parameter in order to control execution of the data engine 390.

When the sequencer or the data engine executes processing in the loop, data cannot be written to the memory which is being used for the processing by the sequencer or the data engine. However, due to reasons such as time scheduling, a case occurs where the host CPU or the sequencer at the higher level resets the parameter at the lower level during loop processing. In the semiconductor LSI 300 according to this embodiment, the memory of each sequencer and the data engine includes the first memory to which a parameter is set by the higher level and the second memory which stores the parameter copied from the first memory for use in the processing of the sequencer or the data engine. Therefore, the host CPU 310 or the sequencer can set a modified parameter to the first memory of the sequencer at the lower level or the first memory 395A of the data engine 390 during loop processing of the sequencer at the lower level or the data engine 390.

An example of the operation of the semiconductor LSI 300 is described hereinafter using a specific example of a video frame which is processed by the semiconductor LSI 300.

Figure 7:
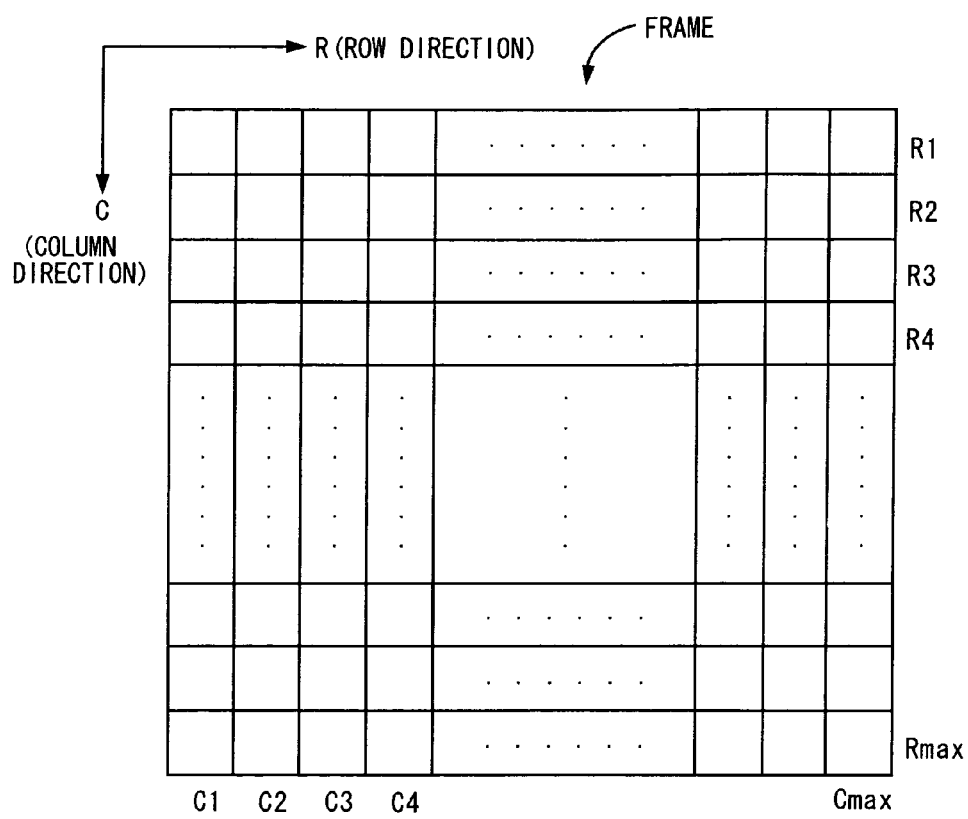
FIG. 7 is a view showing an example of a pixel structure of a frame.

FIG. 7 shows an example of a pixel structure of a video frame. As shown therein, the size of the frame is "Cmax× Rmax", with Cmax number of pixels in the crosswise direction or the row direction (R direction) and Rmax number of pixels in the lengthwise direction or the column direction (C direction). The semiconductor LSI 300 performs processing in units of pixels, in the sequence from the top row to the bottom row, and, for each row, in the sequence from a pixel at the left column to a pixel at the right column. Specifically, in the example of FIG. 7, processing is performed in the sequence of row R1, row R2, row R3, . . . , and row Rmax, and, for each row, in the sequence from a pixel at column C1, a pixel at column C2, a pixel at column C3, . . . , and a pixel at column Cmax.

The sequencer 330 performs sequence control in units of frames, and the count value of the loop counter 334 indicates the number of the currently processed frame. The sequencer 360 performs sequence control in units of rows, and the count value of the loop counter 364 indicates the number of the currently processed row.

The data engine 390 performs noise reduction for each pixel on pixel data of each row which is sequentially input. The noise reduction is weighted averaging between the pixel value of a given pixel and the pixel values of previous and subsequent pixels. Note that the data engine 390 according to this embodiment includes a loop counter (not shown) that counts the number of the column of the currently processed pixel.

Prior to the overall operation of the semiconductor LSI 300, an example of the flow of the process performed by the sequencer in this embodiment is described with reference to FIG. 8, using the sequencer 360 as a representative example. Note that, it is assumed that parameters are already set to the sequencer 360 and the data engine 390 and a power is supplied from the clock/power control unit 400. Further, although a clock is supplied from the clock/power control unit 400 to the sequencer 360, clock supply from the from the clock/power control unit 400 to the data engine 390 is blocked. Note that the parameter which is set to the sequencer 360 may be a program code to be executed by the sequencer 360, the number of rows of the frame (Rmax) or the like, and the parameter which is set to the data engine 390 may be a program code to be executed by the data engine 390, the number of pixels of one row, i.e., the number of columns of the frame (Cmax) or the like.

Figure 8:
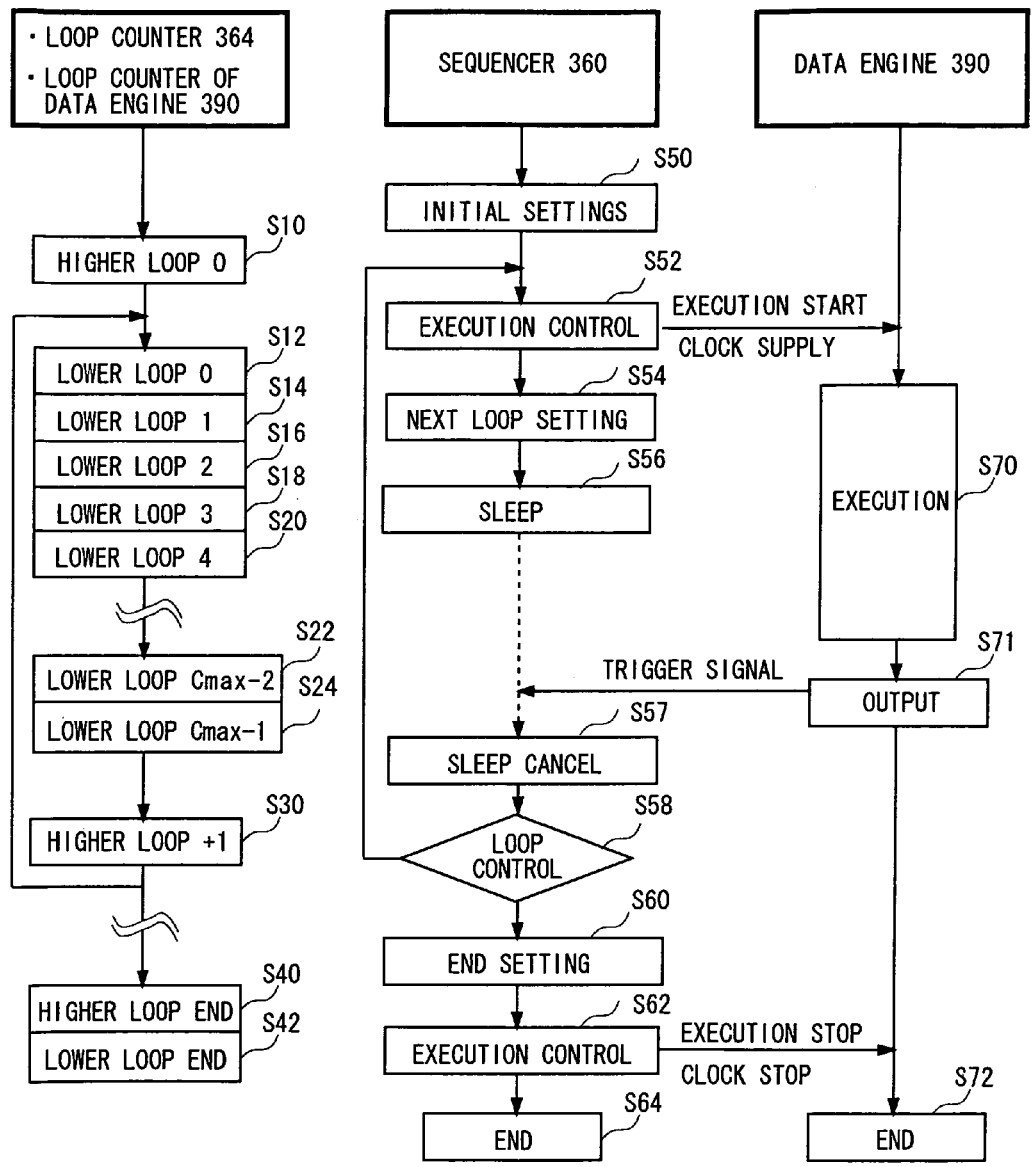
FIG. 8 is a view to explain an example of operation of a sequencer in the semiconductor LSI shown in FIG. 5.

The flowchart at the left of FIG. 8 shows the operation of the loop counter 364 of the sequencer 360 and a loop' counter, which is not shown, of the data engine 390. The flowchart at the middle of FIG. 8 shows the operation of the sequencer 360. The flowchart at the right of FIG. 8 shows the operation of the data engine 390.

First, the sequencer 360 makes various initial settings for processing a frame according to the parameter which is set to the memory 361 of itself (S50). Then, the loop counter 364 counts up by one, and the first higher loop (higher loop 0) is thereby started (S10). In each sequencer and the data engine 390, a period from the previous count-up to the current count-up of the loop counter is one loop, and a loop at the higher level of the sequencer and the immediately lower level (the sequencer or the data engine 390) is a higher loop, and a loop at the lower level thereof is a lower loop. In this example, a loop in the sequencer 360 is the higher loop, and a loop in the data engine 390 is a lower loop.

Further, as described earlier, the loop counter 364 in the sequencer 360 indicates the row number of the currently processed pixel. Therefore, at this timing, the count value of the loop counter 364 indicates the row R1.

To process the row R1, the sequence controller 363 of the sequencer 360 outputs the clock/power control signal indicating the start of clock supply to the data engine 390 to the clock/power control unit 400 and further outputs the control signal indicating the start of execution to the data engine 390 (S52).

Clock supply from the clock/power control unit 400 to the data engine 390 is thereby started, and the data engine 390 starts operating and executes noise reduction for the pixels in the current row (S70).

With the start of the operation of the data engine 390, the loop counter, not shown, of the data engine 390 starts count-up, and the first lower loop (lower loop 0) thereby starts (S12). As described earlier, the loop counter, not shown, of the data engine 390 indicates the column number of the currently processed pixel. Therefore, the count value of the loop counter of the data engine 390 indicates the column C1 in this example. Thus, processing of the pixel in the row R1 and the column C1 is started.

After the execution control in Step S52, the sequencer 360 makes various settings for processing the next row (the row R2) of the currently processed row and then enters the sleep mode (S54, S56). Note that the sequencer 360 enters the sleep mode by outputting the clock/power control signal for blocking clock supply to itself to the clock/power control unit 400.

During execution of the data engine 390 (S70), the loop counter of the data engine 390 continues count-up with the progress of processing, and thereby the lower loop makes transition from the lower loop 0, the lower loop 1, the lower loop 2, . . . , the lower loop (Cmax-2), to the lower loop (Cmax-1) (S14 to S24).

At the completion of the lower loop (Cmax-1), the count value of the loop counter of the data engine 390 becomes Cmax. The processing of all pixels in the current row (the row R1) thereby ends.

When the count value of the loop counter of the data engine 390 becomes Cmax, the data engine 390 clears the count value of the loop counter of itself and further outputs a trigger signal to the sequencer 360 (S71).

The sleep control block of the sequencer 360 in sleep mode receives the trigger signal from the data engine 390 and then outputs the clock/power control signal for enabling clock supply to the sequencer 360 to the clock/power control unit 400. The sleep mode of the sequencer 360 is thereby cancelled (S57).

When clock supply from the clock/power control unit 400 is resumed, the sequencer 360 performs loop control (S58). The loop control is performed depending on whether the last higher loop is completed or not (in this example, whether the count value of the loop counter 364 is Rmax or not). When the count value of the loop counter 364 is not Rmax, the sequencer 360 returns to Step S52 and performs execution control of the data engine 390. Further, the loop counter 364 counts up by one (the higher loop +1) (S30). Then, the lower loop is repeated from Step S12.

In Step S58. when the sequencer 360 confirms the completion of the last higher loop, it makes various settings at the end (S60), and then performs control for the stop of execution of the data engine 390 and the stop of clock supply to the data engine 390 (S62). The data engine 390 thereby enters the sleep mode, and processing of one frame thereby ends (S64, S72).

Note that, if, in FIG. 8, Cmax is replaced by the number of frames, and further "loop counter 364, loop counter (not shown) of data engine 390" at the left are replaced by "loop counter 334, "loop counter 364", "sequencer 360" at the middle is replaced by "sequencer 330", and "data engine 390" at the right is replaced by "sequencer 360", the flowchart showing an example of the flow of the process performed by the sequencer 330 is obtained. This is not described in detail.

Figure 9:
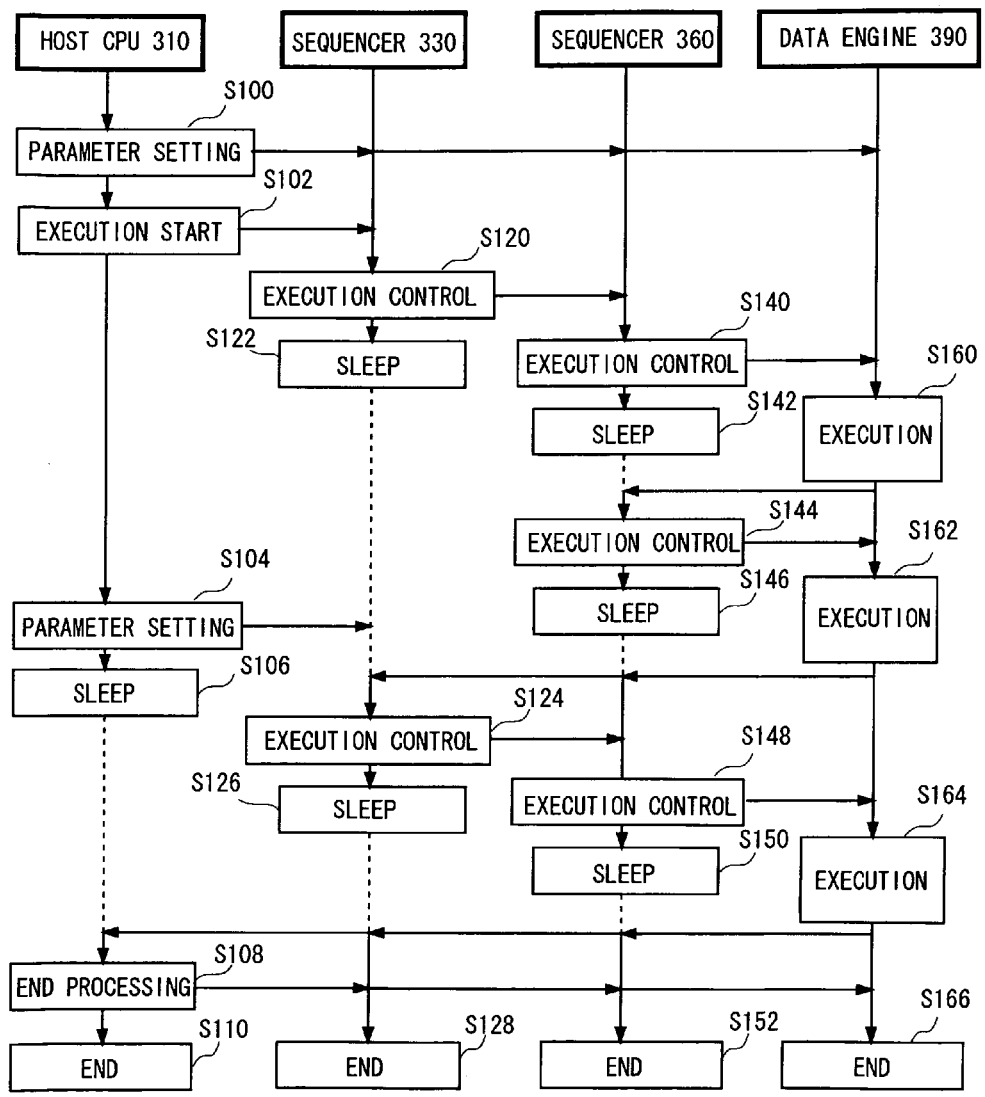
FIG. 9 is a view to explain an example of operation of the entire semiconductor LSI shown in FIG. 5.

FIG. 9 shows an example of the flow of the overall operation of the semiconductor LSI 300. The flow is described, beginning with when the semiconductor LSI 300 is powered on. It is assumed that, at this time, the host CPU 310 is in active mode, and the sequencer 330, the sequencer 360 and the data engine 390 are in sleep mode.

The host CPU 310 sets parameters to the sequencer 330, the sequencer 360 and the data engine 390 (S 100). As described earlier, in the semiconductor LSI 300, the host CPU 310 can set a parameter not only for the immediately lower level but also for a lower level skipping some hierarchy levels.

Although the host CPU 310 sets the parameters of the functional blocks at all lower levels in this example, the host CPU 310 may set the parameter of the sequencer 330, the sequencer 330 may set the parameter of the sequencer 360, and the sequencer 360 may set the parameter of the data engine 390. Further, the sequencer 330 may set the parameters of the sequencer 360 and the data engine 390 as a matter of course.

Further, some parameters of the functional blocks of the sequencer 330 and the lower level (for example, program codes for execution of the functional blocks) may be all set by the host CPU 310, and the other parameters (for example, values such as the number of frames and the number of rows to be used in execution) may be set by the immediately higher level of the functional block.

Next, the host CPU 310 performs control to start clock supply to the sequencer 330 and execution of the sequencer 330 (S102).

The sequencer 330 whose execution is started performs control to start clock supply to the sequencer 360 and execution of the sequencer 360 (S120). Then, the sequencer 330 enters the sleep mode (S122).

The sequencer 360 whose execution is started performs control to start clock supply to the data engine 390 and execution of the data engine 390 (S140). Then, the sequencer 360 enters the sleep mode (S142).

The data engine 390 whose execution is started sequentially processes the pixels in the current row (S160). At the completion of processing of the last pixel in the row, the data engine 390 transmits a trigger signal to the sequencer 360. The sequencer 360 thereby cancels the sleep mode of its own.

The sequencer 360 to which clock supply is resumed from the clock/power control unit 400 controls the data engine 390 so as to process the next row (S 144). The sequencer 360 then enters the sleep mode again (S146).

The data engine 390 sequentially processes the pixels in the next row (S162). At the completion of processing of the last pixel in the row, the data engine 390 outputs a trigger signal to the sequencer 360. The sequencer 360 thereby cancels the sleep mode of its own.

Assume that the last loop of the sequencer 360 (which is the higher loop for the data engine 390 and the lower loop for the sequencer 330) is completed, that is, processing of the current frame is completed. Thus, the sequencer 360 outputs a trigger signal to the sequencer 330. The sequencer 330 thereby cancels the sleep mode of its own.

Note that, during the sleep mode of the sequencer 330, the host CPU 310 may modify the parameter of the sequencer 330 (S104). After modifying the parameter of the sequencer 330, the host CPU 310 may enter the sleep mode (S106).

The processing is repeated in this manner, and, at the completion of processing of all frames of the video, the host CPU 310 performs processing for the end of execution, such as various settings at the end (S108). The processing of the host CPU 310, the sequencer 330, the sequencer 360 and the data engine 390 thereby ends (S110, S128, S152 and S166).

Note that, at the end of processing, those functional blocks may enter the sleep mode or the power-off mode by control of their own or the immediately higher level.

The semiconductor LSI 300 according to this embodiment can have the effect of suppressing power consumption more efficiently, in addition to the above-described effects. In the semiconductor LSI 300, the sequencer and the data engine have a notification channel that transmits a trigger signal to the immediately higher level through the control bus, so that the sleep mode of the immediately higher level can be cancelled promptly. With this configuration, together with the above-described configuration in which the reference channel and the control channel are placed independent of each other, quick power control at the clock cycle accuracy level can be realized, thereby reducing the unnecessary power consumption period.

<Third Embodiment>

The technique according to the present invention has a significant advantage in the case where the number of data engines to perform parallel processing is large. As a third embodiment, an example of a semiconductor LSI in this case is described.

Figure 10:
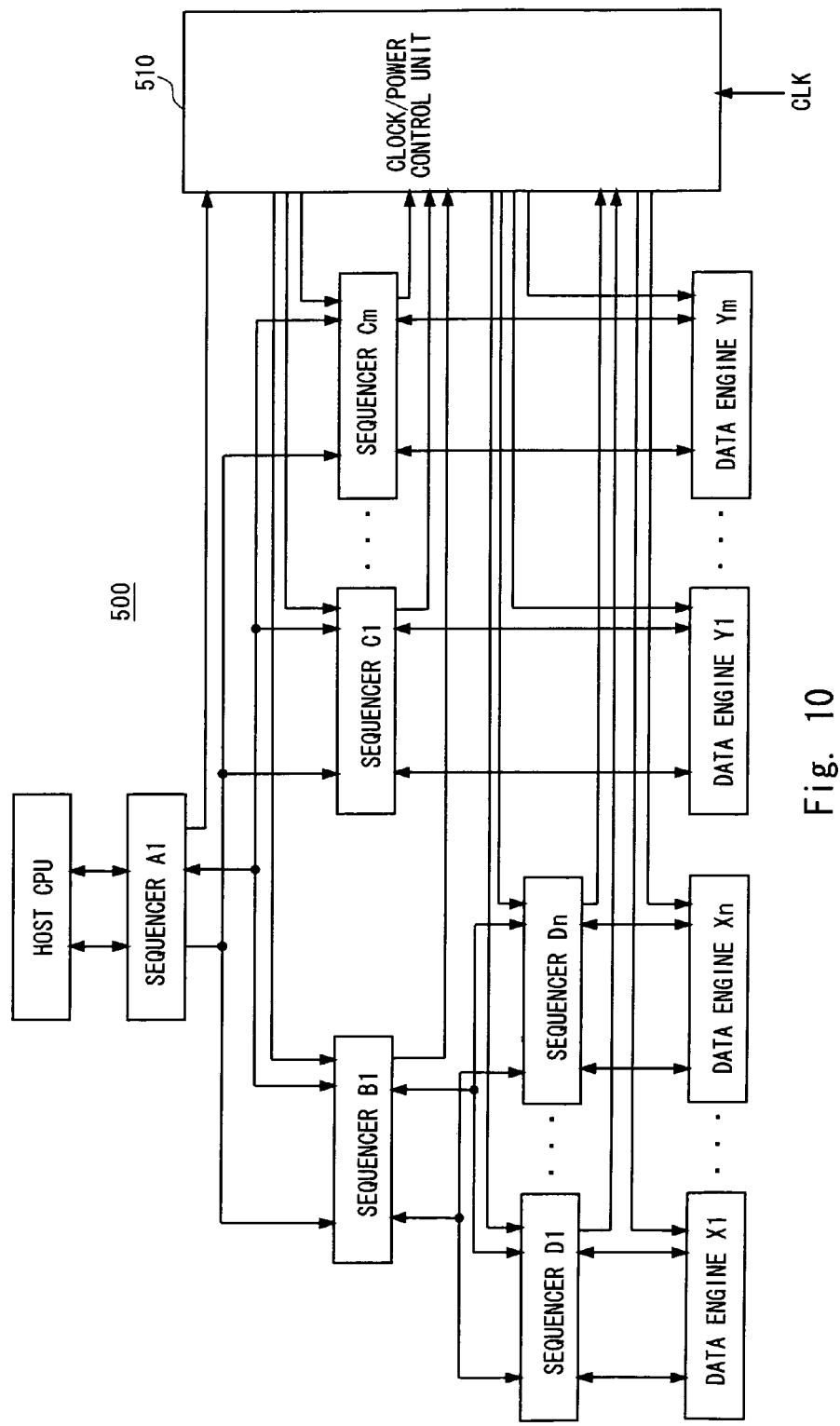
FIG. 10 is a view showing a semiconductor LSI according to a third embodiment of the present invention.

FIG. 10 shows a semiconductor LSI 500 according to the third embodiment of the present invention. The semiconductor LSI 500 includes a host CPU, a plurality of sequencers (A1, B1, D1, ..., Dn, C1, ..., Cm), a plurality of data engines (X1, ..., Xn, Y1, ..., Ym), and a clock/power control unit 510. To facilitate understanding, interface units of the functional blocks, lines for clock supply in sleep mode and so on are omitted in the following drawings.

The sequencer A1 is placed immediately below the host CPU and controlled by the host CPU.

The sequencer B1, the sequencer C1, ..., the sequencer Cm are placed at the immediately lower level of the sequencer A1 and controlled by the sequencer A1.

The sequencers C1, ..., Cm are respectively connected with the data engines Y1, ..., Ym at the immediately lower level, and control those data engines.

On the other hand, the sequencer B1 is further connected with the sequencers D1, ..., Dn at the immediately lower level, not with the data engine. Those sequencers are controlled by the sequencer B1.

The sequencers D1, ..., Dn are respectively connected with the data engines X1, ..., Xn at the immediately lower level, and control those data engines.

Each sequencer included in the semiconductor LSI 500 has the same configuration as each sequencer in the semiconductor LSI 100, and detailed explanation thereof is omitted.

Figure 11:
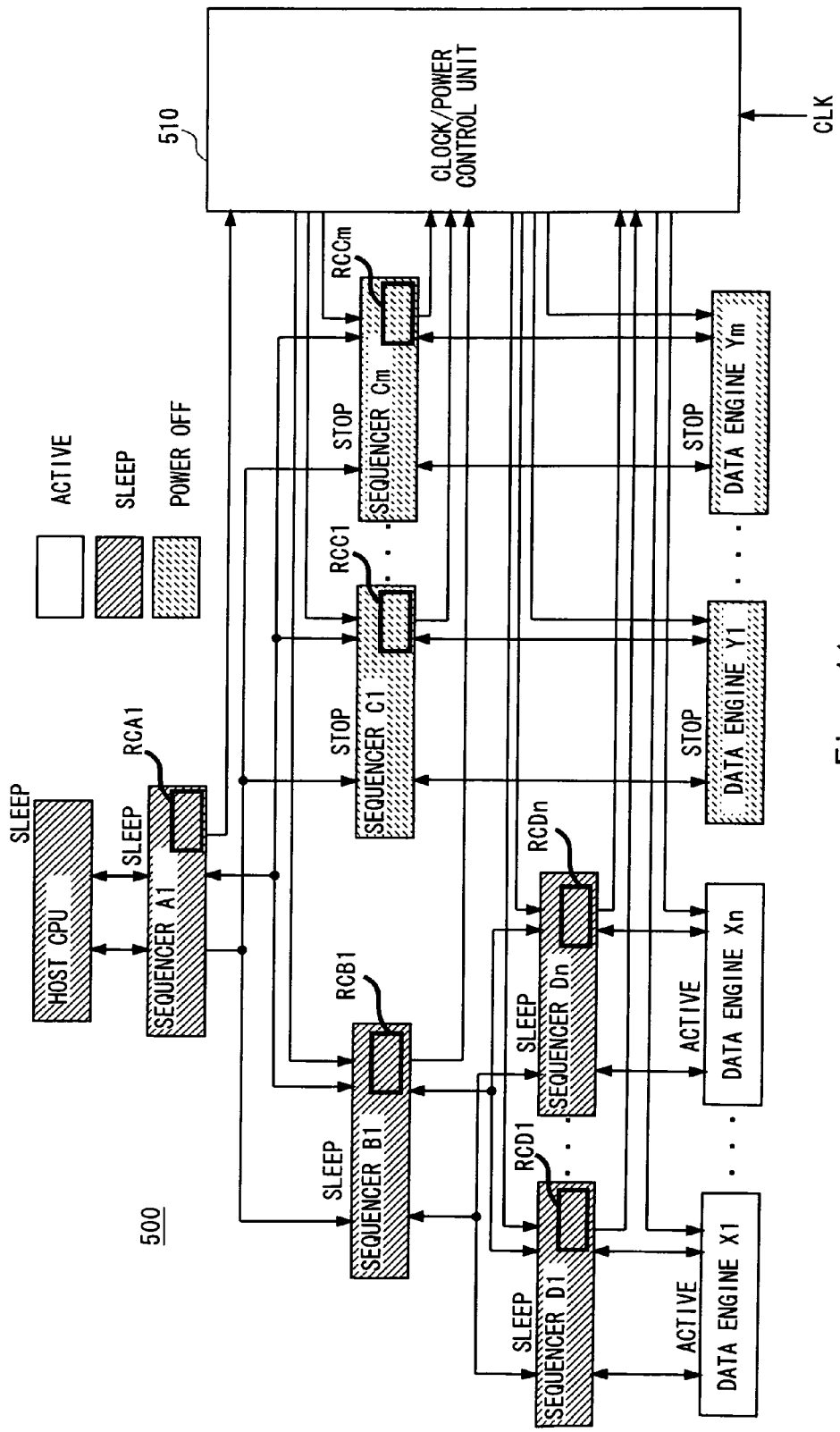
FIG. 11 is a view showing an example of clock and power supply to functional blocks of the semiconductor LSI shown in FIG. 10.

By applying the power consumption control technique according to the present invention to the semiconductor LSI with a large number of data engines, precise control of power consumption becomes possible. FIG. 11 shows an example.

In FIG. 11, the diagonally shaded rectangle indicates that the state of the functional block represented by the rectangle is "sleep", and the dot shaded rectangle indicates that the state of the functional block represented by the rectangle is "power-off". Further, the non-shaded rectangle indicates that the state of the functional block represented by the rectangle is "active".

In the example of FIG. 11, the data engines X1, ..., Xn of the semiconductor LSI 500 are in active mode, receiving clock and power supply. The host CPU is in sleep mode where clock supply is blocked while power supply is provided. Further, the sequencers D1, ..., Dn that respectively control the data engines X1, ..., Xn, the sequencer B1 that controls the sequencers D1, ..., Dn, and the sequencer A1 that controls the sequencer B1 are also in sleep mode where clock supply is blocked while power supply is provided. Note that loop counters (RCA1, RCB1, RCD1, ..., RCDn) of those functional blocks hold count values during the sleep mode. Further, the data engines Y1, ..., Ym are in the power-off mode where both power and clock supply is blocked, and the sequencers C1, ..., Cm that respectively control the data engines Y1, ..., Ym are also in the power-off mode. In loop counters (RCC1, ..., RCCm) of those functional blocks, count values are cleared.

As shown in the example of in FIG. 11, clock and power supply to each functional block of the semiconductor LSI 500 can be controlled precisely.

Reduction of memory capacity by the technique according to the present invention is described specifically, taking the semiconductor LSI 500 shown in FIG. 10 as an example. This is described with reference to the example of FIG. 12.

Figure 12:
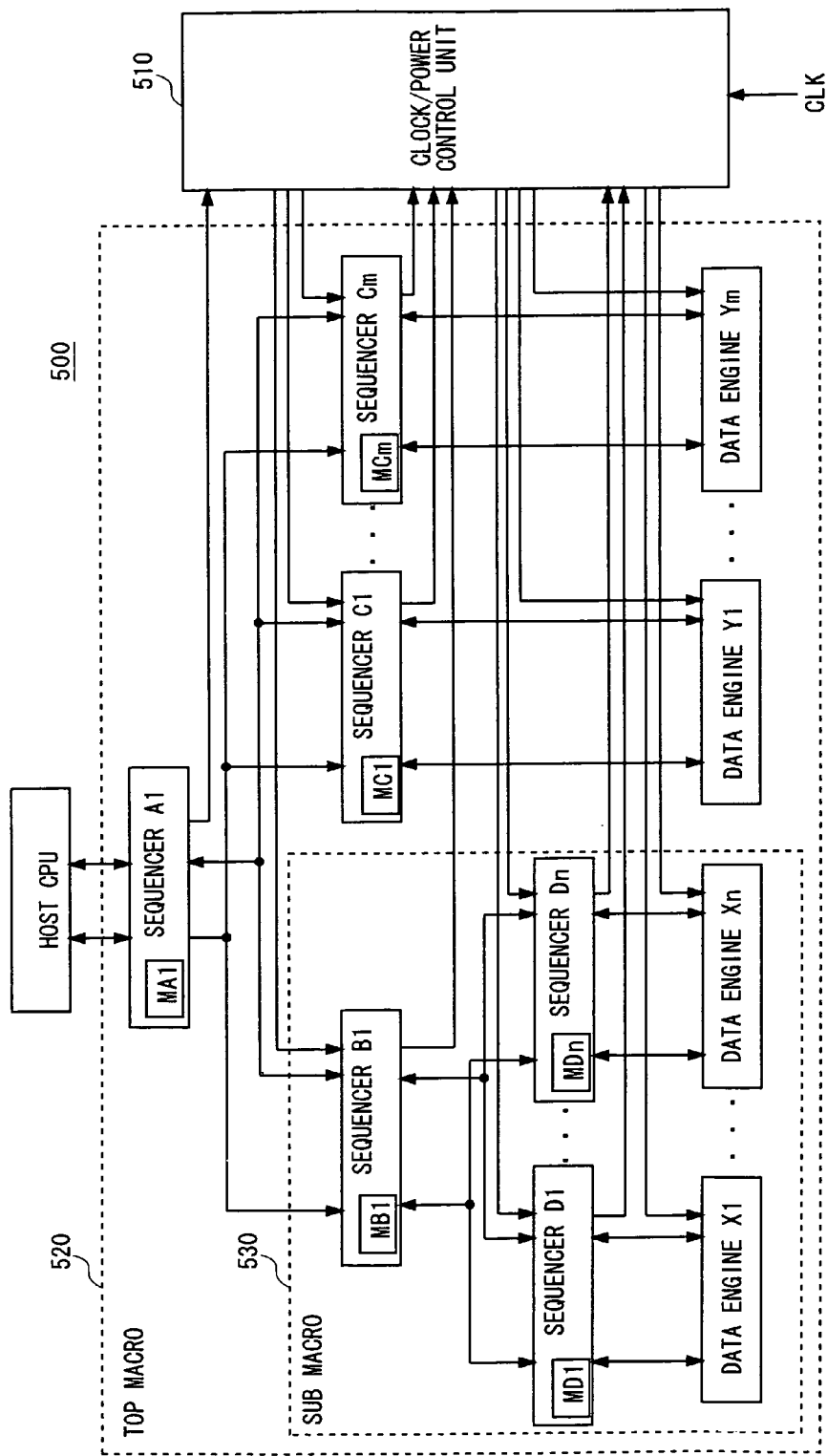
FIG. 12 is a view to explain an example in which a sequencer or a data engine shares a parameter stored in a higher-level sequencer.

FIG. 12 is a view explicitly illustrating a top macro 520 and a sub macro 530 for the semiconductor LSI 500 shown in FIG. 10. The sub macro 530 is composed of the sequencer B1, the sequencers D1, ..., Dn, and the data engines X1, ..., Xn. The top macro 520 is composed of the sequencer A1, the sequencers C1, ..., Cm, and the data engines Y1, ..., Ym. MA1, MB1, MC1, ..., MCm, MD1, ..., MDm are memories that store parameters in the respective sequencers.

For example, the data engines X1, ..., Xn of the sub macro 530 respectively require the parameters which are stored in the memory MD1 of the sequencer D1 to the memory MDn of the sequencer Dn and further require the parameter which is stored in the memory MB1 of the sequencer B1. If the data engines X1, ..., Xn cannot access the memory MB1 of the sequencer B1, it is necessary to store the parameter stored in the memory MB1 of the sequencer B1 into the memories of the data engines X1, ..., Xn. According to the technique of the present invention, because each sequencer includes the memory controller and the specifications of the interface unit are the same, the data engines X1, ..., Xn can access the memory MB1 of the sequencer B1. Therefore, the data engines X1, ..., Xn can acquire the parameter from the memory MB1 of the sequencer B1, and it is thus not necessary to store the parameter into each data engine, thus enabling reduction of the memory capacity of the data engine.

The same applies to each data engine of the top macro 520. For example, the data engines Y1, ..., Ym respectively require the parameters which are stored in the memory MC1 of the sequencer C1 to the memory MCm of the sequencer Cm and further require the parameter which is stored in the memory MB1 of the sequencer B1 and the parameter which is stored in the memory MA1 of the sequencer A1. In this case, because the data engines Y1, ..., Ym can access the memory MA1 of the sequencer A1 and the memory MB1 of the sequencer B1 according to the technique of the present invention, those data engines can acquire the parameters from the memories of the sequencer A1 and the sequencer B1. It is thus not necessary to store the parameters into each data engine, thus enabling reduction of the memory capacity of the data engine.

<Fourth Embodiment>

Wide variations can be expected for precise control of power consumption of a semiconductor LSI. For example, power consumption can be controlled with different precisions for each functional block of a semiconductor LSI by increasing or decreasing the number of hierarchy levels of sequencers in each functional block of the semiconductor LSI. An example is described with reference to FIG. 13.

Figure 13:
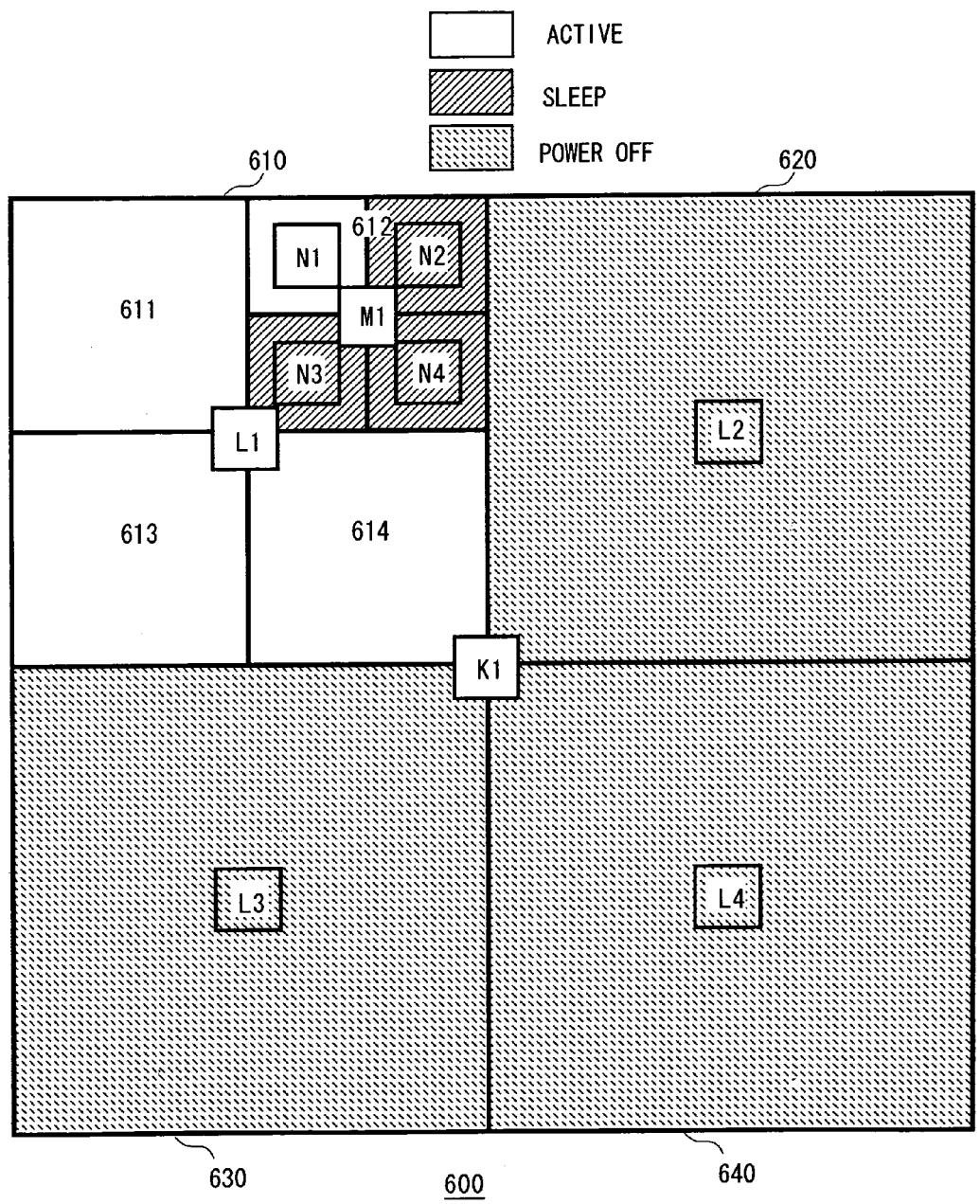
FIG. 13 is a view showing a semiconductor LSI according to a fourth embodiment of the present invention.
Figure 14:
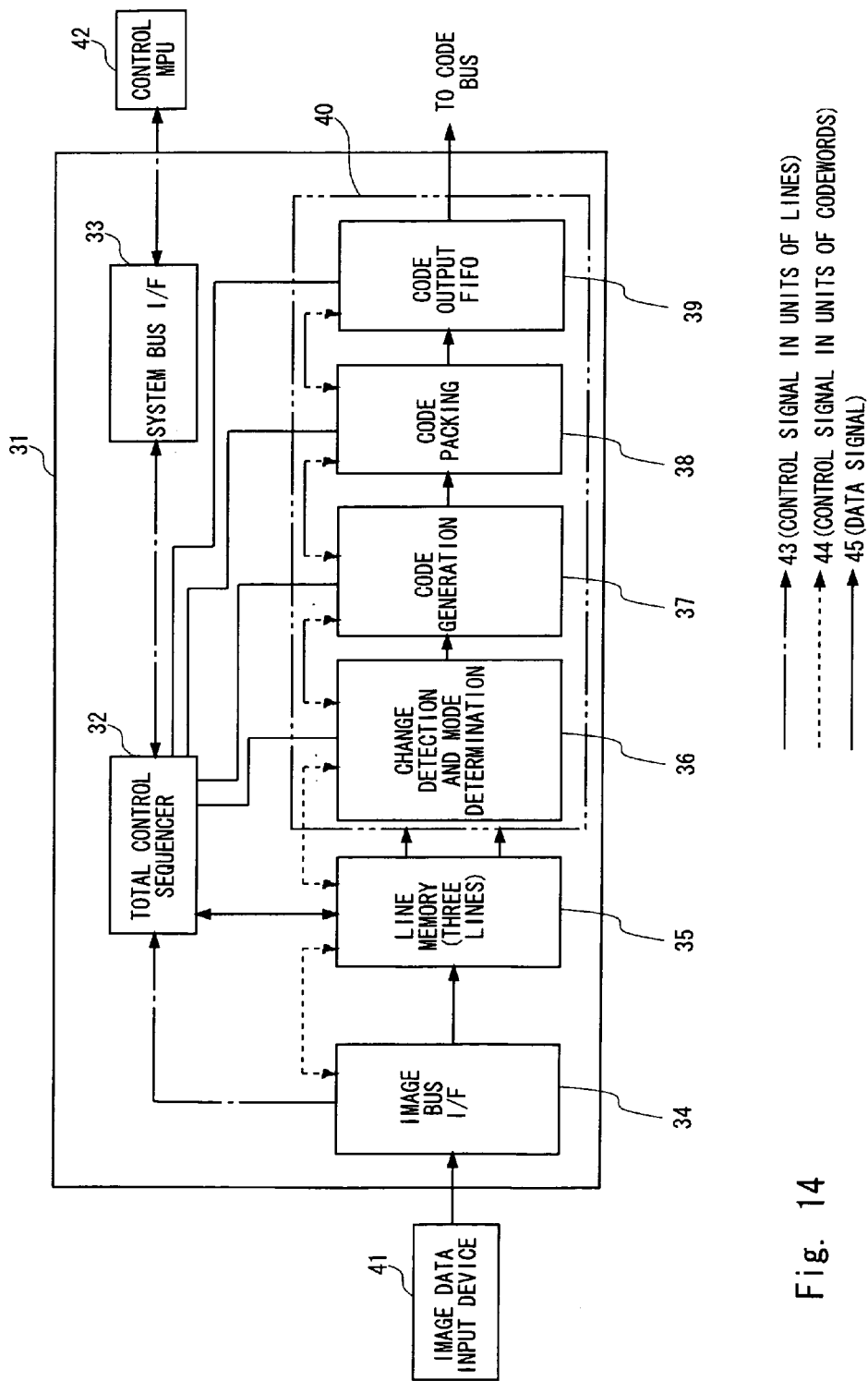
FIG. 14 is a view to explain related art.
Figure 15:
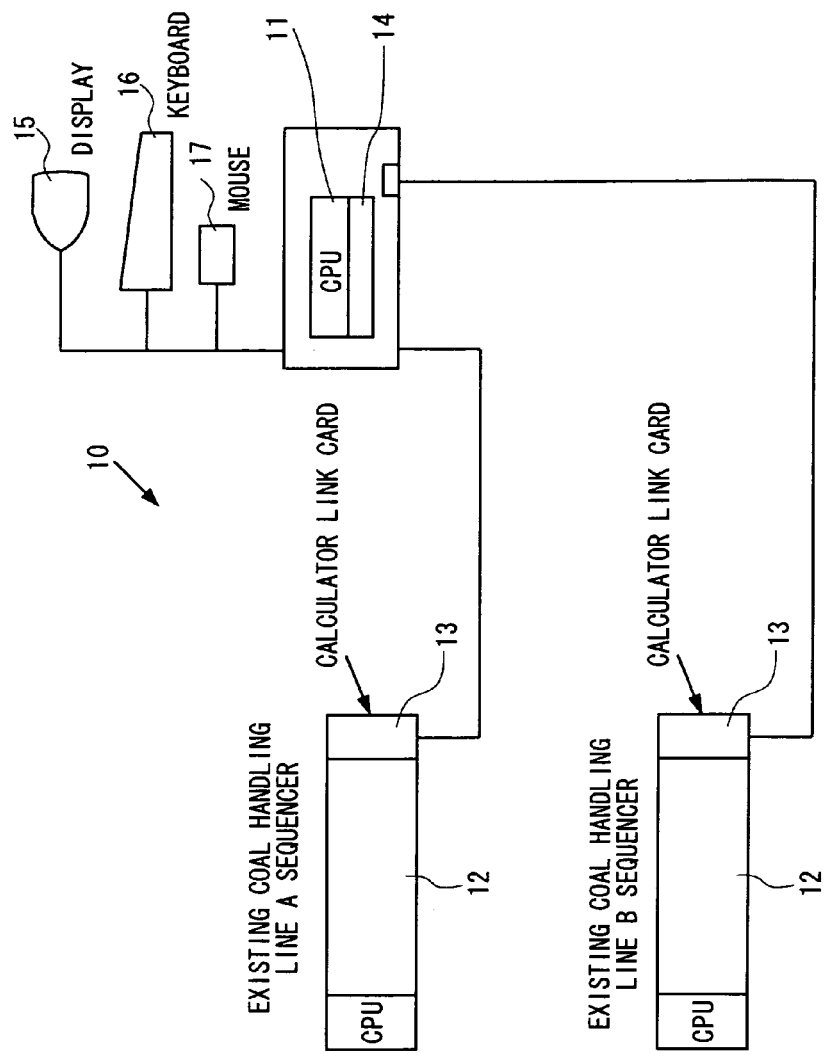
FIG. 15 is another view to explain related art.

A semiconductor LSI 600 in the example shown in FIG. 13 is broadly divided into four domains (upper left domain 610, upper right domain 620, lower left domain 630 and lower right domain 640). The upper left domain 610 is further divided into four domains (upper left domain 611, upper right domain 612, lower left domain 613 and lower right domain 614). The upper right domain 612 is further divided into four domains (upper, lower, left and right domains).

In the semiconductor LSI 600, a sequencer at the highest level is a sequencer K1. At the immediately lower level of the sequencer K1, four sequencers (sequencer L1, sequencer L2, sequencer L3 and sequencer L4) that respectively perform sequence control of the upper left domain 610, the upper right domain 620, the lower left domain 630 and the lower right domain 640 are connected in parallel. The sequencer L1 is a sequencer at the highest level in the upper left domain 610, and a sequencer at the highest level (sequencer M1) in the upper right domain 612 is connected at the immediately lower level of the sequencer L1. At the immediately lower level of the sequencer M1, four sequencers (sequencer N1, sequencer N2, sequencer N3 and sequencer N4) that respectively control the four domains (upper, lower, left and right domains) of the upper right domain 612 are connected in parallel.

Note that, in the semiconductor LSI 600, although the sequencer K1 is connected with a host CPU at the immediately higher level, and the sequencers L2, L3, L4, N1, N2, N3 and N4 are connected with data engines at the immediately lower level thereof, they are not shown in FIG. 13 to facilitate understanding.

In the semiconductor LSI 600, by applying the technique of the present invention, clock and power supply can be controlled for each domain. In the example of FIG. 13, the upper right domain 620, the lower left domain 630 and the lower right domain 640 are in power-off mode where clock and power supply is blocked. In the upper left domain 610, the upper left domain 611, the upper right domain 612, the lower left domain 613, and the lower right domain 614 are in active mode where clock and power are supplied. In the upper right domain 612, three domains, excluding the upper left domain which is controlled by the sequencer N1, are in sleep mode where clock supply is blocked while power supply is provided. Note that the upper left domain which is controlled by the sequencer N1 is in active mode.

The easiness of segmentation of the hierarchy of sequencers by the technique according to the present invention allows precise control of power consumption as shown in FIG. 13.

Although embodiments of the present invention are described in the foregoing, the present invention is not restricted to the above-described embodiments, and various changes and modifications may be made without departing from the scope of the invention. All such changes and modifications as would be obvious to one skilled in the art are intended for inclusion within the scope of the present invention.

For example, the semiconductor LSI 300 according to the second embodiment shown in FIG. 5 has a configuration in which the memory of each sequencer and the data engine includes the first memory to which a parameter is set by the higher level and the second memory which stores the parameter copied from the first memory for use in the processing of the sequencer or the data engine. Therefore, the host CPU 310 or the sequencer in the semiconductor LSI 300 can set a modified parameter to the first memory of the sequencer at the lower level or the first memory 395A of the data engine 390 during loop processing of the sequencer at the lower level or the data engine 390. In this case, in each sequencer and the data engine, the modified parameter can be reflected on the second memory in one clock, which is prompt.

A higher level (the host CPU 310 or the sequencer) may set a modified parameter during loop processing of each sequencer or the data engine without dividing the memory of the sequencer and the data engine into the first memory and the second memory. In this case, when setting a parameter to a lower level, if the lower level is during loop processing, the host CPU 310 and the sequencer temporarily store the parameter to be set to the lower level into the memory of their own. Then, at the completion of loop processing of the lower level, the host CPU 310 and the sequencer transfer the temporarily stored parameter to the memory at the lower level.

In this configuration, while the timing to reflect the modified parameter to allow reference by the lower level takes a plurality of cycles, it enables reduction of the memory capacity of the lower level. It is thus advantageous in the case where prompt reflection of parameter modification is not particularly needed.

Note that, in the embodiments described above, each sequencer includes the clock/power control interface unit so as to control clock and power supply to itself and the immediately lower level. Each sequencer may be configured so as to control clock supply or power supply only. Further, the clock/power control bus may be separated as a clock control bus and a power control bus, and the first line may be separated as a clock line and a power supply line. Furthermore, the clock/power control unit may be divided into a clock control unit and a power control unit.

Further, control of clock supply to functional blocks is not limited to on/off of clock supply. For example, clock supply may be separated between "normal mode" and "power saving mode". In normal mode, a clock with 200 MHz may be supplied, and, in power saving mode, the frequency of a supplied clock may be reduced to 100 MHz or 50 MHz, which is lower than 200 MHz in normal mode, instead of blocking clock supply (disabling clock supply).

The same applies to power supply. For example, power supply may be also separated between "normal mode" and "power saving mode". In normal mode, a power with 1.2 V may be supplied, and, in power saving mode, the voltage of a supplied power may be reduced to 1.1 V or 1.0 V, which is lower than 1.2 V in normal mode, instead of blocking power supply.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Further, the embodiments described above can be combined as desirable by one of ordinary skill in the art.

Furthermore, it is noted that, Applicant's intent is to encompass equivalents of all claim elements, even if amended later during prosecution.

What is claimed is:

1. A semiconductor integrated circuit that sequentially performs predetermined processing on data input successively, comprising:
    a host CPU;
    a data engine that executes the predetermined processing; and
    a plurality of sequencers,
    wherein
        the host CPU, the data engine and the plurality of sequencers are connected in a hierarchical manner with the host CPU at top and the data engine at bottom,
        each of the plurality of sequencers includes
            a memory that stores a parameter for execution of the sequencer,
            a memory controller,
            a loop counter,
            a sequence controller, and
            an interface unit that handles transmission and reception of signals with an external unit of the sequencer,
        the data engine includes
            a memory that stores a parameter for execution of the data engine, and
            an interface unit that handles transmission and reception of signals with an external unit of the data engine,
        the host CPU includes
            an interface unit that handles transmission and reception of signals with an external unit of the host CPU,
        the interface units of the plurality of sequencers have the same specifications, each interface unit including
            a first master interface unit for accessing a memory in an external functional block of the sequencer,
            a second master interface unit for controlling execution of an external functional block of the sequencer,
            a first slave interface unit for allowing access to the memory of the sequencer by an external functional block of the sequencer, and
            a second slave interface unit for allowing control of execution of the sequencer by an external functional block of the sequencer,
        the interface unit of the host CPU includes
            a first master interface unit and a second master interface unit respectively having the same specifications as the first master interface unit and the second master interface unit of the plurality of sequencers,
        the interface unit of the data engine includes a first slave interface unit and a second slave interface unit respectively having the same specifications as the first slave interface unit and the second slave interface unit of the plurality of sequencers, and the host CPU, the plurality of sequencers and the data engine are connected in such a way that a higher level accesses a memory of one or a plurality of lower levels through the first master interface unit of the higher level and the first slave interface unit of the one or the plurality of lower levels, and a higher level controls execution of an immediately lower level through the second master interface unit of the higher level and the second slave interface unit of the immediately lower level.

2. The semiconductor integrated circuit according to claim 1, wherein the plurality of sequencers and the data engine execute processing by referring to the parameter set to the memory of their own, and the host CPU and the plurality of sequencers set the parameter to a memory of one or a plurality of lower levels, and controls execution of an immediately lower level by referring to a state of the parameter stored in a memory of the immediately lower level, the state changing with a progress of the processing.

3. The semiconductor integrated circuit according to claim 2, wherein each memory of the plurality of sequencers and the data engine includes a first memory and a second memory, the plurality of sequencers and the data engine copy the parameter set to the first memory of their own to the second memory and execute processing by referring to the parameter copied to the second memory, and the host CPU and the plurality of sequencers set the parameter to the first memory of the one or the plurality of lower levels, and controls execution of the immediately lower level by referring to a state of the parameter stored in the second memory of the immediately lower level.

4. The semiconductor integrated circuit according to claim 2, wherein the host CPU and the plurality of sequencers temporarily store a parameter to be set next to a lower level into the memory of their own when the lower level executes the processing, and transfer the parameter to be set next temporarily stored in the memory of their own to the memory of the lower level when the lower level completes the processing.

5. The semiconductor integrated circuit according to claim 1, further comprising:

a clock control unit that controls clock supply to the plurality of sequencers and the data engine, wherein the interface unit of each of the plurality of sequencers further includes a clock input interface unit that receives a clock from the clock control unit and supplies the clock to the sequencer, and a clock control interface unit that outputs a clock control signal for controlling clock supply to either one or both of the sequencer and an immediately lower level of the sequencer to the clock control unit, the interface unit of the data engine further includes a clock input interface unit that receives a clock from the clock control unit and supplies the clock to the data engine, and the clock control unit controls clock supply to the sequencer or the immediately lower level of the sequencer according to the clock control signal from each of the plurality of sequencers.

6. The semiconductor integrated circuit according to claim 2, further comprising:

a clock control unit that controls clock supply to the plurality of sequencers and the data engine, wherein the interface unit of each of the plurality of sequencers further includes a clock input interface unit that receives a clock from the clock control unit and supplies the clock to the sequencer, and a clock control interface unit that outputs a clock control signal for controlling clock supply to either one or both of the sequencer and an immediately lower level of the sequencer to the clock control unit, the interface unit of the data engine further includes a clock input interface unit that receives a clock from the clock control unit and supplies the clock to the data engine, and the clock control unit controls clock supply to the sequencer or the immediately lower level of the sequencer according to the clock control signal from each of the plurality of sequencers.

7. The semiconductor integrated circuit according to claim 3, further comprising:

a clock control unit that controls clock supply to the plurality of sequencers and the data engine, wherein the interface unit of each of the plurality of sequencers further includes a clock input interface unit that receives a clock from the clock control unit and supplies the clock to the sequencer, and a clock control interface unit that outputs a clock control signal for controlling clock supply to either one or both of the sequencer and an immediately lower level of the sequencer to the clock control unit, the interface unit of the data engine further includes a clock input interface unit that receives a clock from the clock control unit and supplies the clock to the data engine, and the clock control unit controls clock supply to the sequencer or the immediately lower level of the sequencer according to the clock control signal from each of the plurality of sequencers.

8. The semiconductor integrated circuit according to claim 4, further comprising:

a clock control unit that controls clock supply to the plurality of sequencers and the data engine, wherein the interface unit of each of the plurality of sequencers further includes a clock input interface unit that receives a clock from the clock control unit and supplies the clock to the sequencer, and a clock control interface unit that outputs a clock control signal for controlling clock supply to either one or both of the sequencer and an immediately lower level of the sequencer to the clock control unit, the interface unit of the data engine further includes a clock input interface unit that receives a clock from the clock control unit and supplies the clock to the data engine, and the clock control unit controls clock supply to the sequencer or the immediately lower level of the sequencer according to the clock control signal from each of the plurality of sequencers.

9. The semiconductor integrated circuit according to claim 1, further comprising:
a power control unit that controls power supply to the plurality of sequencers and the data engine,
wherein
the interface unit of each of the plurality of sequencers further includes
a power input interface unit that receives a power from the power control unit and supplies the power to the sequencer, and
a power control interface unit that outputs a power control signal for controlling power supply to either one or both of the sequencer and an immediately lower level of the sequencer to the power control unit, the interface unit of the data engine further includes
a power input interface unit that receives a power from the power control unit and supplies the power to the data engine, and
the power control unit controls power supply to the sequencer or the immediately lower level of the sequencer according to the power control signal from each of the plurality of sequencers.

10. The semiconductor integrated circuit according to claim 2, further comprising:
a power control unit that controls power supply to the plurality of sequencers and the data engine,
wherein
the interface unit of each of the plurality of sequencers further includes
a power input interface unit that receives a power from the power control unit and supplies the power to the sequencer, and
a power control interface unit that outputs a power control signal for controlling power supply to either one or both of the sequencer and an immediately lower level of the sequencer to the power control unit, the interface unit of the data engine further includes
a power input interface unit that receives a power from the power control unit and supplies the power to the data engine, and
the power control unit controls power supply to the sequencer or the immediately lower level of the sequencer according to the power control signal from each of the plurality of sequencers.

11. The semiconductor integrated circuit according to claim 3, further comprising:
a power control unit that controls power supply to the plurality of sequencers and the data engine,
wherein
the interface unit of each of the plurality of sequencers further includes
a power input interface unit that receives a power from the power control unit and supplies the power to the sequencer, and
a power control interface unit that outputs a power control signal for controlling power supply to either one or both of the sequencer and an immediately lower level of the sequencer to the power control unit, the interface unit of the data engine further includes
a power input interface unit that receives a power from the power control unit and supplies the power to the data engine, and
the power control unit controls power supply to the sequencer or the immediately lower level of the sequencer according to the power control signal from each of the plurality of sequencers.

12. The semiconductor integrated circuit according to claim 4, further comprising:
a power control unit that controls power supply to the plurality of sequencers and the data engine,
wherein
the interface unit of each of the plurality of sequencers further includes
a power input interface unit that receives a power from the power control unit and supplies the power to the sequencer, and
a power control interface unit that outputs a power control signal for controlling power supply to either one or both of the sequencer and an immediately lower level of the sequencer to the power control unit, the interface unit of the data engine further includes
a power input interface unit that receives a power from the power control unit and supplies the power to the data engine, and
the power control unit controls power supply to the sequencer or the immediately lower level of the sequencer according to the power control signal from each of the plurality of sequencers.

13. The semiconductor integrated circuit according to claim 5, wherein
the plurality of sequencers and the data engine transmit a trigger signal to an immediately higher level at completion of processing started with execution controlled by the immediately higher level.

14. The semiconductor integrated circuit according to claim 6, wherein
the plurality of sequencers and the data engine transmit a trigger signal to an immediately higher level at completion of processing started with execution controlled by the immediately higher level.

15. The semiconductor integrated circuit according to claim 7, wherein
the plurality of sequencers and the data engine transmit a trigger signal to an immediately higher level at completion of processing started with execution controlled by the immediately higher level.

16. The semiconductor integrated circuit according to claim 8, wherein
the plurality of sequencers and the data engine transmit a trigger signal to an immediately higher level at completion of processing started with execution controlled by the immediately higher level.

17. The semiconductor integrated circuit according to claim 9, wherein
the plurality of sequencers and the data engine transmit a trigger signal to an immediately higher level at completion of processing started with execution controlled by the immediately higher level.

18. The semiconductor integrated circuit according to claim 10, wherein
the plurality of sequencers and the data engine transmit a trigger signal to an immediately higher level at completion of processing started with execution controlled by the immediately higher level.

19. The semiconductor integrated circuit according to claim 1, wherein
among the plurality of sequencers, a lower-level sequencer is connected to be able to accesses a memory of one or a plurality of higher-level sequencers through the first master interface unit of the lower-level sequencer and the first slave interface unit of the one or the plurality of higher-level sequencers.

20. The semiconductor integrated circuit according to claim 1, wherein
the interface unit of the data engine further includes a first master interface unit having the same specifications as the first master interface unit of the plurality of sequencers, and
the data engine is connected to be able to accesses a memory of one or a plurality of sequencers through the first master interface unit of the data engine and the first slave interface unit of the one or the plurality of sequencers.

* * * * *